United States Patent
Owada

[19]

[11] Patent Number: 6,014,566
[45] Date of Patent: Jan. 11, 2000

[54] MOBILE COMMUNICATION SYSTEM

[75] Inventor: Junichi Owada, Tokyo, Japan

[73] Assignee: NEC Corporation, Tokyo, Japan

[21] Appl. No.: 08/856,615

[22] Filed: May 13, 1997

[30] Foreign Application Priority Data

May 13, 1996 [JP] Japan ..................................... 8-142217

[51] Int. Cl.[7] ................................................. H04Q 7/20
[52] U.S. Cl. ........................... 455/444; 455/436; 455/441
[58] Field of Search ..................................... 455/441, 444, 455/448, 436, 552, 449, 443, 524, 525, 439, 437, 432, 422, 513

[56] References Cited

U.S. PATENT DOCUMENTS

| | | | |
|---|---|---|---|
| 5,396,645 | 3/1995 | Huff ......................................... | 455/444 |
| 5,513,380 | 4/1996 | Ivanov et al. ............................ | 455/444 |
| 5,548,806 | 8/1996 | Yamaguchi et al. ..................... | 455/444 |
| 5,787,348 | 7/1998 | Willey et al. ............................ | 455/441 |
| 5,822,697 | 10/1998 | Matsuzawa ............................. | 455/444 |

FOREIGN PATENT DOCUMENTS

| | | |
|---|---|---|
| 1-144826 | 6/1989 | Japan . |
| 3-92023 | 4/1991 | Japan . |

*Primary Examiner*—Reinhard J. Eisenzopf
*Assistant Examiner*—Greta J. Fuller
*Attorney, Agent, or Firm*—Foley & Lardner

[57] ABSTRACT

A mobile communication system includes mobile terminals, radio base stations belonging to low- and high-speed mobile communication systems, and a mobile subscriber connecting apparatus to which the radio base stations are connected. The system uses both a first communication mode including the low-speed mobile communication system and a micro-cell zone and a second communication mode including the high-speed mobile communication system and a macro-cell zone. Each terminal includes a system mode selecting section for selecting the first or second communication modes constituting a system selection mode, and a terminating call responding section for transmitting, to the radio base station belonging to the low-speed mobile communication system, a terminating call response signal to which movement state information indicating that the mobile terminal is moving at a high speed is added, in response to a received call signal, when the system selection mode is set to the first communication mode, and the mobile terminal is moving at a high speed. The connecting apparatus includes a notifying section for notifying an originating subscriber that the terminal is moving at a high speed, upon reception of a terminating call response signal having movement state information added thereto through the radio base station.

10 Claims, 13 Drawing Sheets

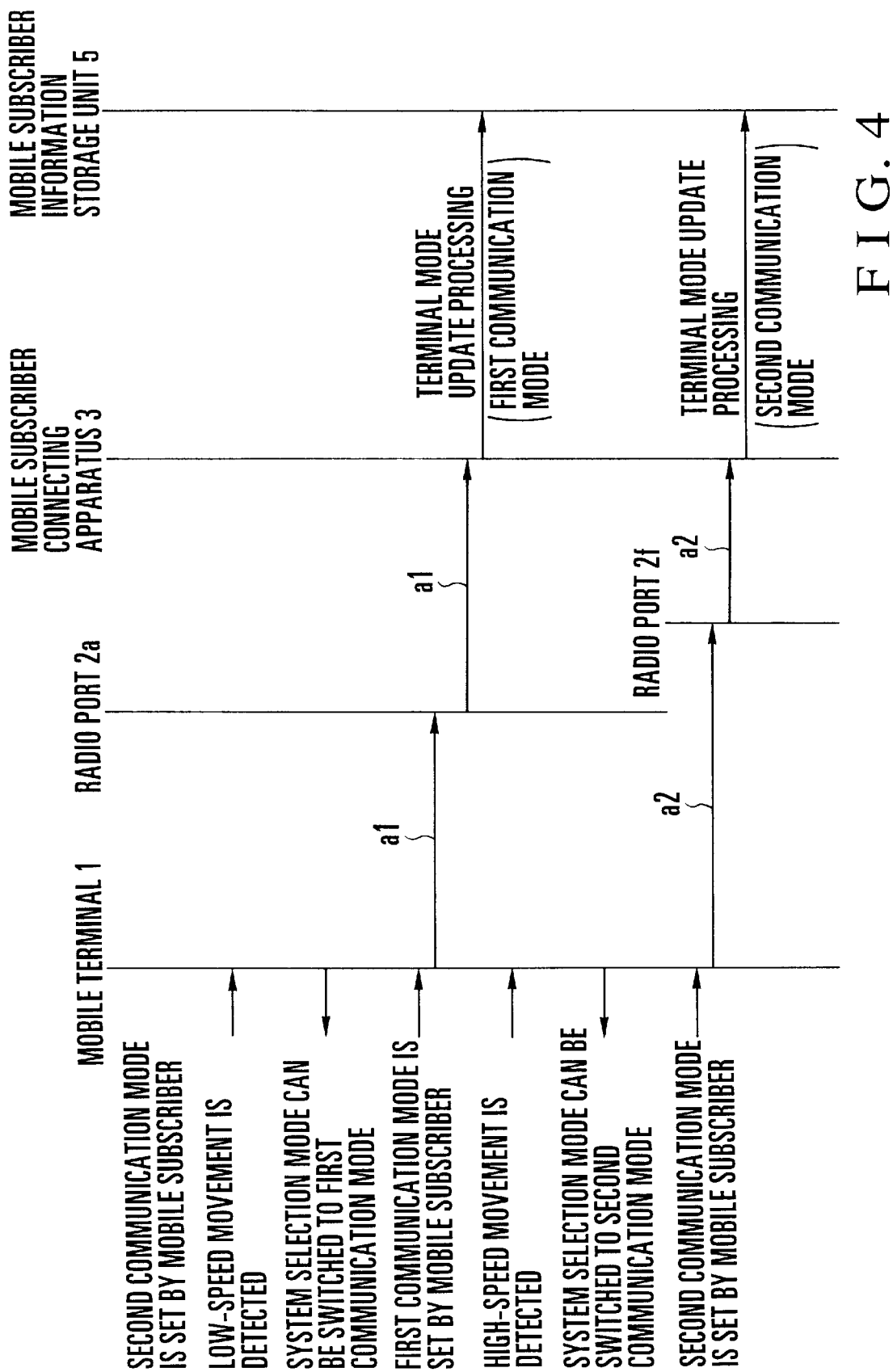
F I G. 4

MOBILE COMMUNICATION SYSTEM

BACKGROUND OF THE INVENTION

The present invention relates to a mobile terminal radio calling system having communication functions in both a high-speed mobile communication mode and a low-speed mobile communication mode in a mobile communication system using both the modes and, more particularly, to a radio calling system which notifies a mobile subscriber of the reception of a terminating call even if the mobile terminal is moving at a high speed and set in the low-speed mobile communication mode.

As a conventional mobile communication system of this type, for example, Japanese Patent Laid-Open No. 3-92023 discloses a system which can ensure communication when the moving speed of a mobile radio unit exceeds a predetermined speed. In this system, a dedicated calling radio base station which covers all the service areas respectively covered by a plurality of radio base stations is connected to a gateway switching unit through a transmission line. The dedicated calling radio base station is used to call a mobile radio unit upon reception of a terminating call when the mobile radio unit in a standby state in the mobile communication system is moving at a speed equal to or higher than a speed determined in terms of system design, and the transmission of a position registration signal is kept stopped. With this operation, even if a mobile radio unit is mounted in a vehicle, e.g., an automobile, which moves at a high speed, a terminating call is ensured by the use of the dedicated calling radio base station which covers a wide area.

Japanese Patent Laid-Open No. 1-144826 discloses a system in which a dedicated calling radio base station can reliably call a mobile radio unit in the process of moving at a high speed. In this system, when the communication quality of one of a plurality of channels through which a plurality of radio base stations are exchanging the same communication contents with a mobile radio unit becomes a predetermined value or less, this channel is switched to another channel of another radio base station which satisfies the predetermined communication quality. With this operation, the communication through the old channel is stopped, and the same communication contents can be communicated through a plurality of channels including the new channel without a short break.

FIG. 13 shows a system configuration based on the above two prior arts. As described above, both the prior arts disclosed in Japanese Patent Laid-Open Nos. 3-92023 and 1-144826 aim at preventing a deterioration in communication quality and a state in which a calling operation cannot be performed, which are caused when a mobile terminal under communication moves at a high speed in mobile communication using micro-cell zones satisfying the communication quality requirement, and ensuring a calling function.

In order to achieve the above object, in the arrangement shown in FIG. 13, one of radio base stations (radio ports) 12a to 12e, or a gateway switching unit 13 detects that any radio base station that can perform communication cannot be specified while a mobile terminal 11 is moving at a high speed. The radio base stations 12a to 12e and the gateway switching unit 13 shift the registration division of the identification information of the mobile terminal 11 to a wide-area calling registration division. When a terminating call addressed to the mobile terminal 11 is received, the mobile terminal 11 is called by using a dedicated calling radio base station 14.

However, the above prior arts have the following problems. In the above prior arts, a dedicated calling radio base station must be installed to call a mobile terminal moving at a high speed. Manufacturing and installation costs are required to install a dedicated calling radio base station. In addition, in order to control the dedicated calling radio base station, extra radio channel control and protocol control are required.

Both the prior arts aim at preventing a deterioration in communication quality and interruption of the calling function, which may be caused when a mobile terminal is moving at a high speed. For this reason, according to the conventional systems described above, in a mobile communication system including low-speed communication mode/macro-cell zone mobile terminals and high-speed communication mode/macro-cell zone mobile terminals, when a low-speed mobile communication mode or low-speed mobile communication mode zone mobile terminal moves at a high speed, it is difficult to perform a calling operation or continue communication. With a high-speed communication mode mobile terminal, a calling operation and continuation of speech communication can be easily ensured even under the present situations regardless of the moving speed of the terminal.

Consider a mobile terminal capable of performing communication in both the low-speed mobile communication mode/macro-cell zone and the high-speed mobile communication mode/macro-cell zone. If this mobile terminal is set in the high-speed mobile communication mode, a calling operation and continuation of speech communication can be easily ensured regardless of the moving speed.

Considering the current call rate system, communication using the high-speed mobile communication mode is higher in reference call rate and telephone charge than communication using the low-speed mobile communication mode. For this reason, the low-speed mobile communication mode has attracted a greater deal of attention. That is, a reduction in charge can be achieved by setting the low-speed mobile communication mode as often as possible except that the user waits for an urgent call.

Demands have therefore arisen for a system which can eliminate the difficulties in calling and continuing speech communication when a mobile terminal in the low-speed mobile communication mode is moving at a high speed. That is, if an originating subscriber is notified of at least information about high-speed movement when a mobile terminal set in the low-speed mobile communication mode is moving at a high speed, a radio selective calling operation corresponding to the function of a pager can be realized.

SUMMARY OF THE INVENTION

It is an object of the present invention to provide a mobile communication system which includes both high- and low-speed mobile communication systems, and eliminates the necessity of a dedicated calling radio base station for calling a mobile terminal moving at a high speed.

It is another object of the present invention to provide a mobile communication system which includes both high- and low-speed mobile communication systems, and notifies an originating subscriber, at least, that a mobile terminal is moving at a high speed, thereby realizing a function equivalent to the function of a pager.

In order to achieve the above objects, according to the present invention, there is provided a mobile communication system comprising a plurality of mobile terminals, a plurality of radio base stations belonging to low- and high-speed mobile communication systems and serving to perform radio communication with the mobile terminals, and a mobile subscriber connecting apparatus to which the radio base stations are connected, the mobile communication system using both a first communication mode including the low-speed mobile communication system and a micro-cell zone and a second communication mode including the high-speed mobile communication system and a macro-cell zone, the mobile terminal including mode selecting means for selecting and setting one of the first and second communication modes constituting a system selection mode, and terminating call responding means for transmitting, to the radio base station belonging to the low-speed mobile communication system, a terminating call response signal to which movement state information indicating that the mobile terminal is moving at a high speed is added, in response to a received call signal, when the system selection mode is set to the first communication mode by the mode selecting means, and the mobile terminal is moving at a high speed, and the mobile subscriber connecting apparatus including notifying means for notifying an originating subscriber that the mobile terminal is moving at a high speed, upon reception of a terminating call response signal having movement state information added thereto through the radio base station.

BRIEF DESCRIPTION OF THE DRAWINGS

FIG. 4 is a view showing a sequence of system selection mode update processing according to the third embodiment of the present invention which is to be performed when the mobile terminal detects a change in moving speed;

DESCRIPTION OF THE PREFERRED EMBODIMENTS

The present invention will be described in detail below with reference to the accompanying drawings.

Figure 1:
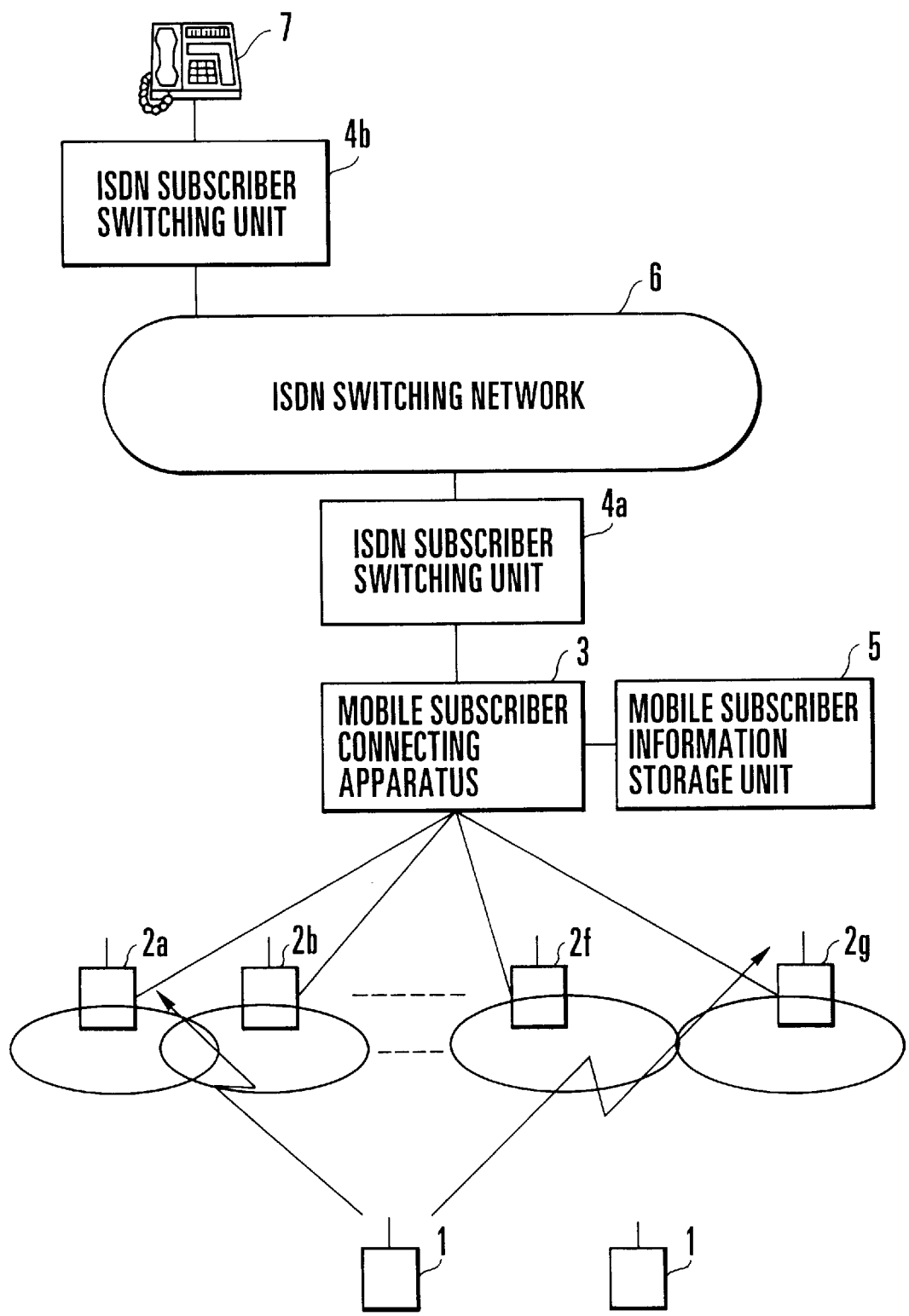
FIG. 1 is a block diagram showing the system configuration of a mobile communication system according to the present invention.

FIG. 1 shows the system configuration of a mobile communication system of the present invention and, more specifically, the overall arrangement including a mobile terminal 1, radio ports 2a to 2g, a mobile subscriber connecting apparatus 3, and a mobile subscriber information storage unit 5. Referring to FIG. 1, the mobile terminal 1 has radio transmission/reception functions for both a low-speed mobile communication system and a high-speed mobile communication system, and includes a display unit for displaying information in the form of characters with respect to a mobile subscriber, and a storage unit for storing information.

The radio ports 2a to 2f are connected to the mobile subscriber connecting apparatus 3. Each radio port belongs to the low-speed mobile communication system and a micro-cell zone, and performs radio communication with the mobile terminal 1. The radio port 2g is connected to the mobile subscriber connecting apparatus 3, belongs to the high-speed mobile communication system and a macro-cell zone, and performs radio communication with the mobile terminal 1. The mobile subscriber connecting apparatus 3 is connected to an ISDN subscriber switching unit 4a, manages the mobile subscriber carrying the mobile terminal 1, and performs call connection. The mobile subscriber connecting apparatus 3 has a function of transmitting predetermined announcement or message information. The mobile subscriber information storage unit 5 is connected to the mobile subscriber connecting apparatus 3, and stores the subscriber data, position information, moving speed mode information, and terminating mode information of each mobile subscriber. A subscriber 7 is connected to an ISDN subscriber switching unit 4b. The ISDN subscriber switching units 4a and 4b are connected to an ISDN switching network 6.

Figures 12A, 12B:
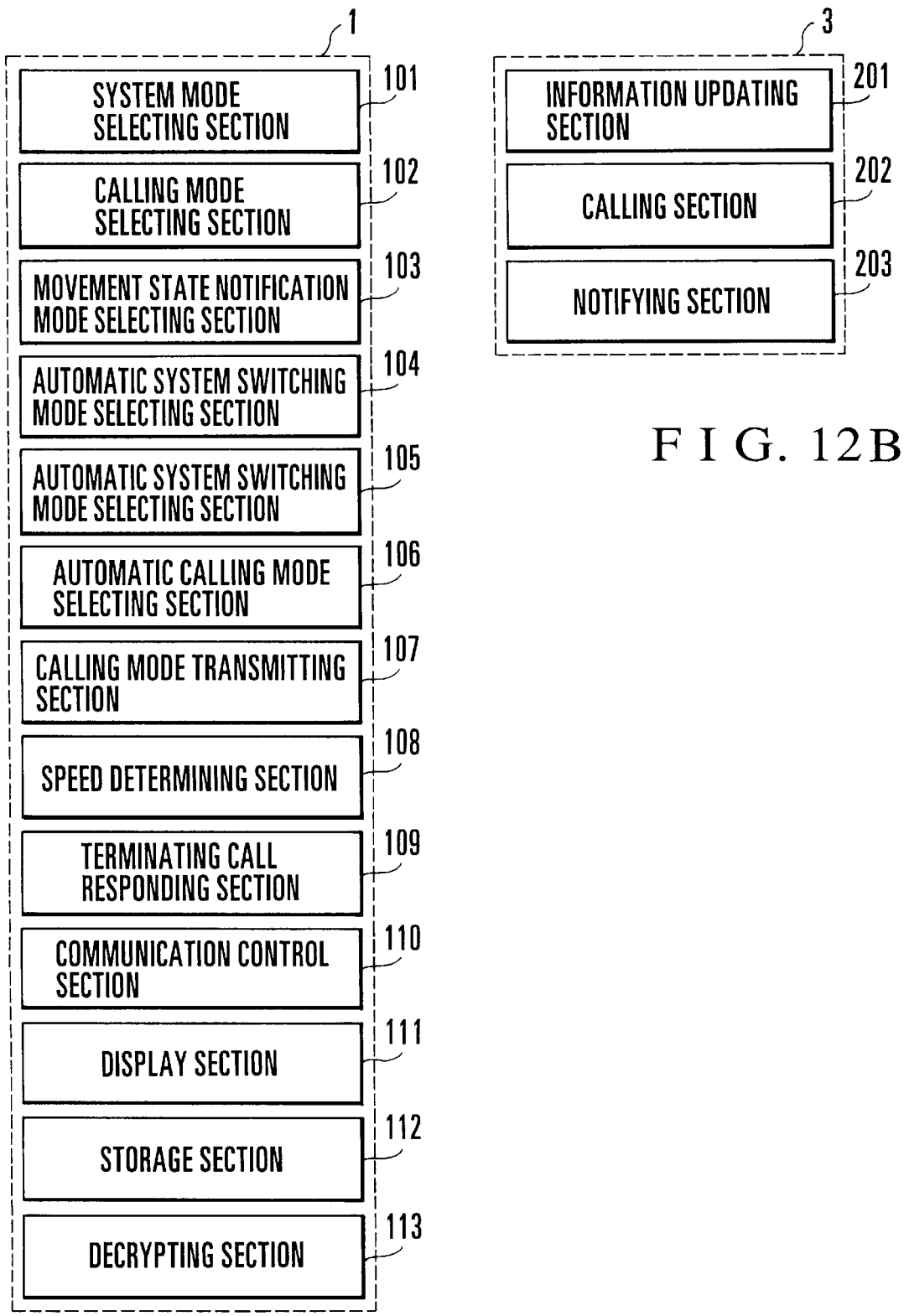
FIGS. 12A and 12B are block diagrams showing the arrangements of the mobile terminal and the mobile subscriber connecting apparatus in FIG. 1, which are commonly used to describe the respective embodiments.
Figure 13:
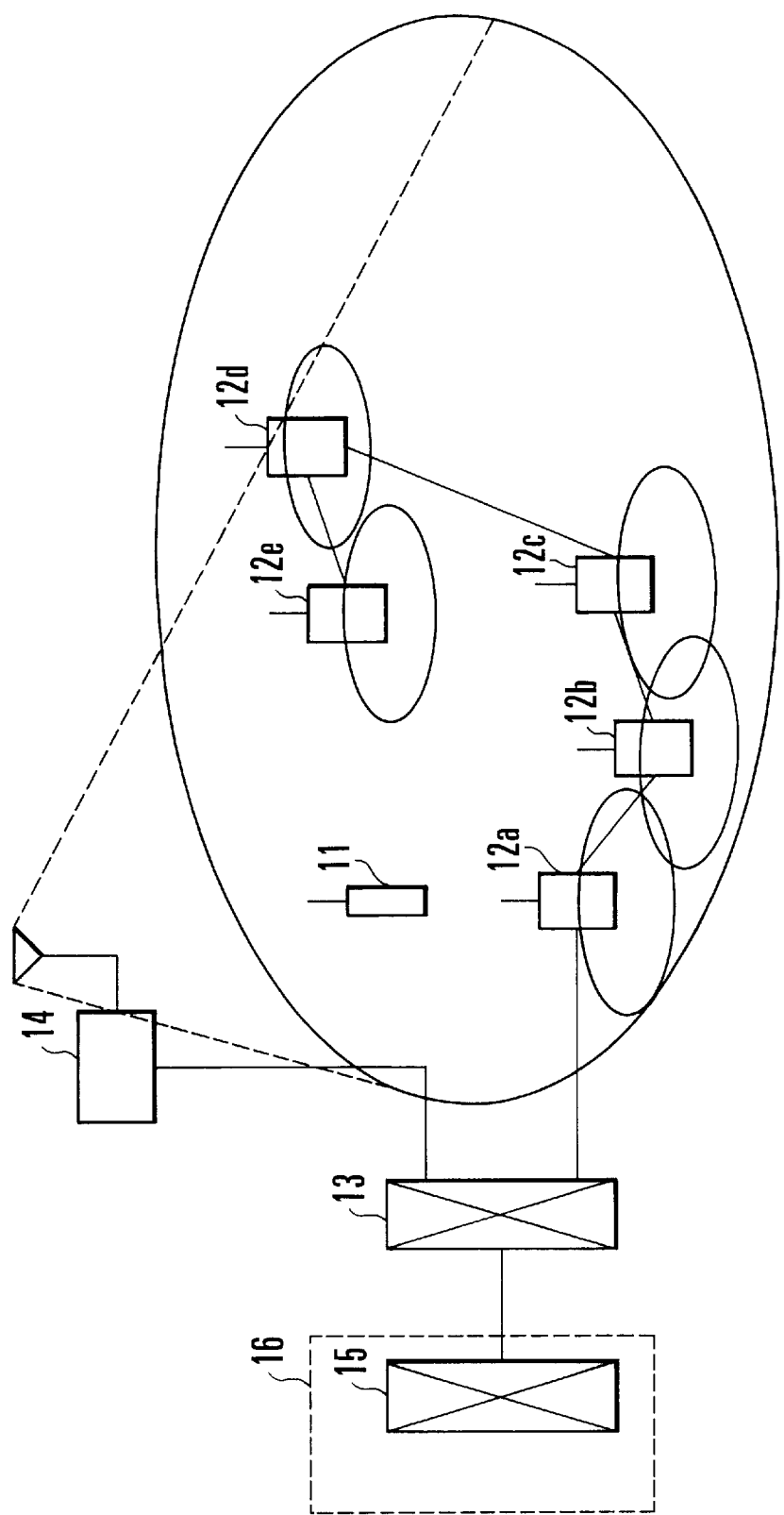
FIG. 13 is a block diagram showing the system configuration of a conventional radio calling system.

FIGS. 12A and 12B show the detailed arrangements of the mobile terminal 1 and the mobile subscriber connecting apparatus 3. These arrangements are common to the first to 10th embodiments to be described later. The mobile terminal 1 comprises a system mode selecting section 101 for selecting the low-/high-speed mobile communication system, a calling mode selecting section 102 for selecting a narrow-/wide-area calling mode, a movement state notification mode selecting section 103 for selecting the ON/OFF state of a movement state notification mode, an automatic system switching mode selecting section 104 for selecting the ON/OFF state of an automatic system switching mode, an automatic system switching mode selecting section 105 for selecting the ON/OFF state of an automatic calling switching mode, an automatic calling mode selecting section 106 for selecting the ON/OFF state of an automatic calling mode, a calling mode transmitting section 107 for transmitting the calling mode information set by the calling mode selecting section 102 to a radio port, a speed determining section 108 for determining the low-/high-speed movement of the mobile terminal 1, a terminating call responding section 109 for transmitting, to a radio port in response to a call signal, a terminating call response signal to which movement state information indicating that the terminal is moving at a high speed is added, a communication control section 110 for registering the position of the mobile terminal 1 and performing originating/terminating control, a display section 111 for displaying, to the mobile subscriber, information indicating that the set system mode can be switched, information indicating that a terminating call is received while the terminal is moving at a high speed, and an originating subscriber number, a storage section 112 for storing the originating subscriber number, and a decrypting section 113 for decrypting the encrypted originating subscriber number.

The mobile subscriber connecting apparatus 3 comprises an information updating section 201 for updating the position information and mode information of the mobile terminal 1, a calling section 202 for transmitting a call signal to a radio port, a notifying section 203 for notifying the originating subscriber that the mobile terminal 1 is moving at a high speed.

The first to seventh embodiments and the 10th embodiment will be briefly described next with reference to the elements, of the constituent elements of the mobile terminal shown in FIG. 12A, which are characteristic of the respective embodiments.

In the first embodiment of the present invention, the speed determining section 108 of the mobile terminal 1 detects the moving speed of the home terminal. When the detected speed exceeds a predetermined speed, the speed determining section 108 determines that the mobile terminal 1 is moving at a high speed. When the detected speed is equal to or lower than the predetermined speed, the section 108 determines that the terminal 1 is moving at a low speed. Alternatively, the speed determining section 108 may determine that the mobile subscriber carrying the mobile terminal 1 is moving at a high or low speed.

The mobile subscriber operates the system mode selecting section 101 of the mobile terminal 1. With this operation, the system selection mode is selected to select the low-speed mobile communication system with the micro-cell zone (to be referred to as a first communication mode hereinafter) or the high-speed mobile communication system with the macro-cell zone (to be referred to as a second communication mode hereinafter) as a target communication system. As a result, a mobile communication system and its zone are set. The communication control section 110 performs position registration and an originating/terminating operation in the selected communication mode. The mobile subscriber then operates the calling mode selecting section 102 to select the narrow-area calling mode of receiving a call in a narrow calling area constituted by one or more radio ports belonging to the high- and low-speed mobile communication systems, or a wide-area calling mode of receiving a call in a plurality of narrow calling areas, thus setting a calling mode. The calling mode transmitting section 107 transmits a calling mode registration signal to a radio port belonging to the selected mobile communication system. In performing position registration, the calling mode transmitting section 107 adds a calling mode to a position registration request signal, and transmits it to the currently selected mobile communication system.

In the second embodiment of the present invention, a mobile terminal 1 includes a movement state notification mode selecting section 103 in addition to the constituent elements of the first embodiment. When the target communication system is set to the low-speed mobile communication system, and the mobile subscriber is moving at a high speed, the movement state notification mode selecting section 103 chooses between notifying the movement state or not notifying it in response to a call signal.

Assume that the target communication system is set to the low-speed mobile communication system, the mobile subscriber is moving at a high speed, and the movement state notification mode is set. In this case, upon reception of a call signal, a terminating call responding section 109 of the mobile terminal 1 transmits, to the low-speed mobile communication system, a terminating call response signal to which movement state information indicating that the mobile subscriber is moving at a high speed is added.

In the third embodiment of the present invention, a mobile terminal 1 includes a display section 111 in addition to the constituent elements of the second embodiment. Assume that the system selection mode is set to the second communication mode. In this case, if it is determined that the home terminal is moving at a low speed, the display section 111 displays, to the mobile subscriber, information indicating that the system selection mode can be switched to the first communication mode. Assume that the system selection mode is set to the first communication mode. In this case, if it is determined that the home terminal is moving at a high speed, the display section 111 displays, to the mobile subscriber, information indicating that the system selection mode can be switched to the second communication mode.

In the fourth embodiment of the present invention, a mobile terminal 1 includes an automatic system switching mode selecting section 104 in addition to the constituent elements of the second embodiment. When it is detected that the moving speed of the home terminal has changed from a low speed to a high speed, the automatic system switching mode selecting section 104 automatically switches the communication mode to the second communication mode. When it is detected that the moving speed of the home terminal has changed from a high speed to a low speed, the automatic system switching mode selecting section 104 automatically switches the communication mode to the first communication mode. Thereafter, the section 104 transmits a position registration request signal to a radio port belonging to the communication mode after the mode switching operation. When the mobile subscriber sets this automatic system switching mode, a system switching operation and a position registering operation are automatically performed.

In the fifth embodiment of the present invention, a mobile terminal 1 includes an automatic system switching mode selecting section 105 in addition to the constituent elements of the second embodiment. When it is detected that the moving speed of the home terminal has changed from a low speed to a high speed, the automatic system switching mode selecting section 105 automatically switches the calling mode to the wide-area calling mode, and transmits a calling mode registration signal indicating that the calling mode has switched to the wide-area calling mode to the mobile communication system selected by the system selection mode at this switching time point, and a radio port belonging to its zone. When it is detected that the moving speed of the home terminal has changed from a high speed to a low speed, the automatic system switching mode selecting section 105 automatically switch the calling mode to the narrow-area calling mode, and transmits a calling mode registration signal indicating that the calling mode has switched to the narrow-area calling mode to the mobile communication system selected by the system selection mode at this switching time point, and a radio port belonging to its zone. When the mobile subscriber sets the above automatic calling switching mode, a calling mode switching operation and a calling mode registration signal transmitting operation are automatically performed.

In the sixth embodiment of the present invention, a mobile terminal 1 includes a display section 111 and a storage section 112 for storing an originating subscriber number, in addition to the constituent elements of the second embodiment. When the home terminal is moving at a high speed, and the movement state notification mode is set in the ON state, the display section 111 displays the originating subscriber number contained in a received call signal to the mobile subscriber. When the mobile subscriber switches the system selection mode from the first communication mode to the second communication mode, or it is detected that the moving speed of the mobile terminal has fallen in the range allowing low-speed mobile communication, the display section 111 notifies the mobile subscriber that a terminating call is received while the terminal is moving at a high speed, together with the stored originating subscriber number.

In the seventh embodiment of the present invention, a mobile terminal 1 includes an automatic calling mode selecting section 106 in addition to the constituent elements of the second embodiment. When the mobile subscriber switches the system selection mode from the first communication mode to the second communication mode, or it is detected that the moving speed of the mobile subscriber has fallen in the range allowing low-speed mobile communication, the automatic calling mode selecting section 106 chooses between automatically generating an originating call or not generating it for the originating subscriber number stored in the storage section. When the mobile subscriber sets the automatic calling mode in the ON state, an originating call is automatically generated for the stored originating subscriber number.

The eighth and ninth embodiments will be briefly described next with reference to the elements, of the constituent elements of the mobile subscriber connecting apparatus shown in FIG. 12B.

In the eighth embodiment, an information updating section 201 of a mobile subscriber connecting apparatus 3 determines the system selection mode and calling mode of a mobile terminal 1 in accordance with a position registration request signal having calling mode information added thereto and transmitted from the mobile terminal 1, and the radio ports which have relayed the position registration request signal, and updates the position information, system selection mode information, and calling mode information of the mobile terminal 1 which are stored in a mobile subscriber information storage unit 5. In addition, upon reception of a calling mode registration signal from the mobile terminal 1, the information updating section 201 updates the calling mode information of the mobile terminal 1 which is stored in the mobile subscriber information storage unit 5.

In the ninth embodiment, a mobile subscriber connecting apparatus 3 includes a calling section 202 and a notifying section 203 in addition to the constituent elements of the eighth embodiment. Upon reception of a terminating signal to a mobile terminal 1, the mobile subscriber connecting apparatus 3 reads out the position information, system selection mode information, and calling mode information of the mobile terminal 1 from a mobile subscriber information storage unit 5, and analyzes them. The calling section 202 transmits a call signal to a radio port group belonging to the selected mobile communication system and corresponding to the narrow/wide calling area in accordance with the narrow-/wide-area calling mode as the analyzed calling mode. Upon reception of a terminating call response signal from the mobile terminal 1, the mobile subscriber connecting apparatus 3 analyzes the movement state information contained in the terminating call response signal. When the movement state information indicates that the terminal is moving at a high speed, the notifying section 203 notifies the originating subscriber that the mobile subscriber is moving at a high speed.

In the 10th embodiment of the present invention, a mobile terminal 1 includes a decrypting section 113 in addition to the constituent elements of the sixth embodiment. When the originating subscriber number contained in a received call signal is encrypted in accordance with a predetermined algorithm, the decrypting section 113 decrypts the original originating subscriber number. A mobile subscriber connecting apparatus 3 encrypts an originating subscriber number in accordance with a predetermined algorithm and adds it to a call signal to the mobile terminal 1.

The operations of the main parts of the first to 10th embodiments will be described next with reference to the sequences shown in FIGS. 2 to 11. A detailed description of the operation of each element in FIGS. 12A and 12B will be omitted in the following description based on FIGS. 2 to 11.

Figure 2:
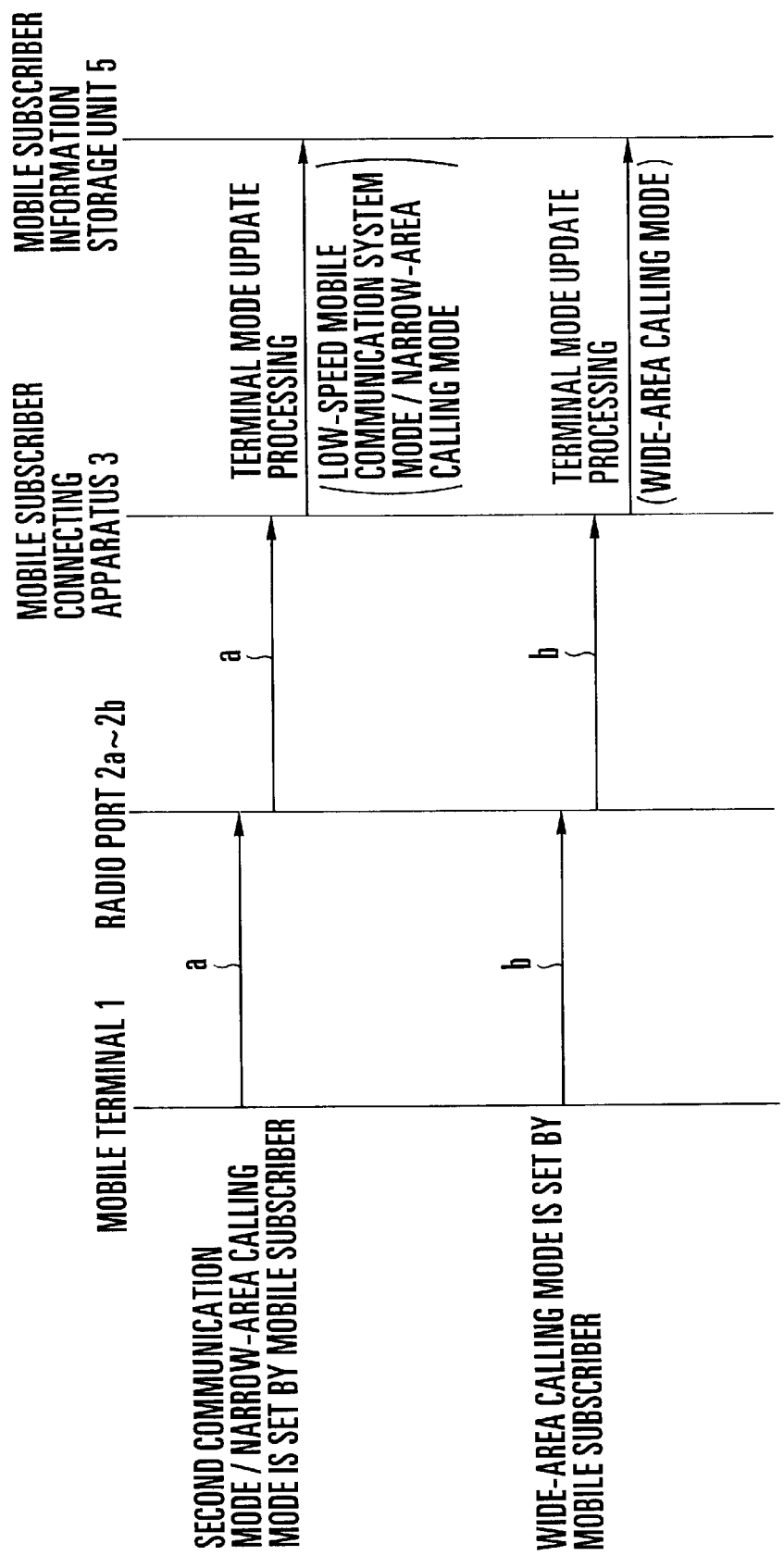
FIG. 2 is a view showing sequences of position registration and calling mode registration according to the first embodiment of the present invention.

FIG. 2 shows sequences of position registration and calling mode registration for the mobile terminal 1 according to the first embodiment.

Position registration performed by the mobile terminal will be described first with reference to FIG. 2. Assume that the mobile subscriber moving at a low speed sets the system selection mode of the mobile terminal 1 to the first communication mode, and the calling mode to the narrow-area calling mode. In this case, the mobile terminal 1 can perform radio communication with the radio ports 2a and 2b belonging to the low-speed mobile communication system. In performing position registration in this state, the mobile terminal 1 adds calling mode information as narrow-area calling mode information to a position registration request signal a, and transmits it to the mobile subscriber connecting apparatus 3 through the radio ports 2a and 2b belonging to the low-speed mobile communication system.

Upon reception of the position registration request signal a from the mobile terminal 1, the mobile subscriber connecting apparatus 3 updates the position information of the mobile terminal 1, which is stored in the mobile subscriber information storage unit 5, in accordance with the radio ports which have relayed the position registration request signal a and the calling mode information added to the position registration request signal a. At the same time, the mobile subscriber connecting apparatus 3 updates the system selection mode to the low-speed mobile communication system mode, and the calling mode information to the narrow-area calling mode.

Calling mode registration performed by the mobile terminal will be described next with reference to FIG. 2. Assume that the mobile subscriber is to move at a high speed, or is moving at a high speed, and sets the calling mode of the mobile terminal 1 to the wide-area calling mode. In this case, the mobile terminal 1 transmits a calling mode registration signal b indicating that the calling mode has switched to the wide-area calling mode to the mobile subscriber connecting apparatus 3 through the radio ports 2a and 2b belonging to the low-speed mobile communication system.

Upon reception of the calling mode registration signal b from the mobile terminal 1, the mobile subscriber connecting apparatus 3 updates the calling mode information of the mobile terminal 1 which is stored in the mobile subscriber information storage unit 5 to the wide-area calling mode information.

Figure 3:
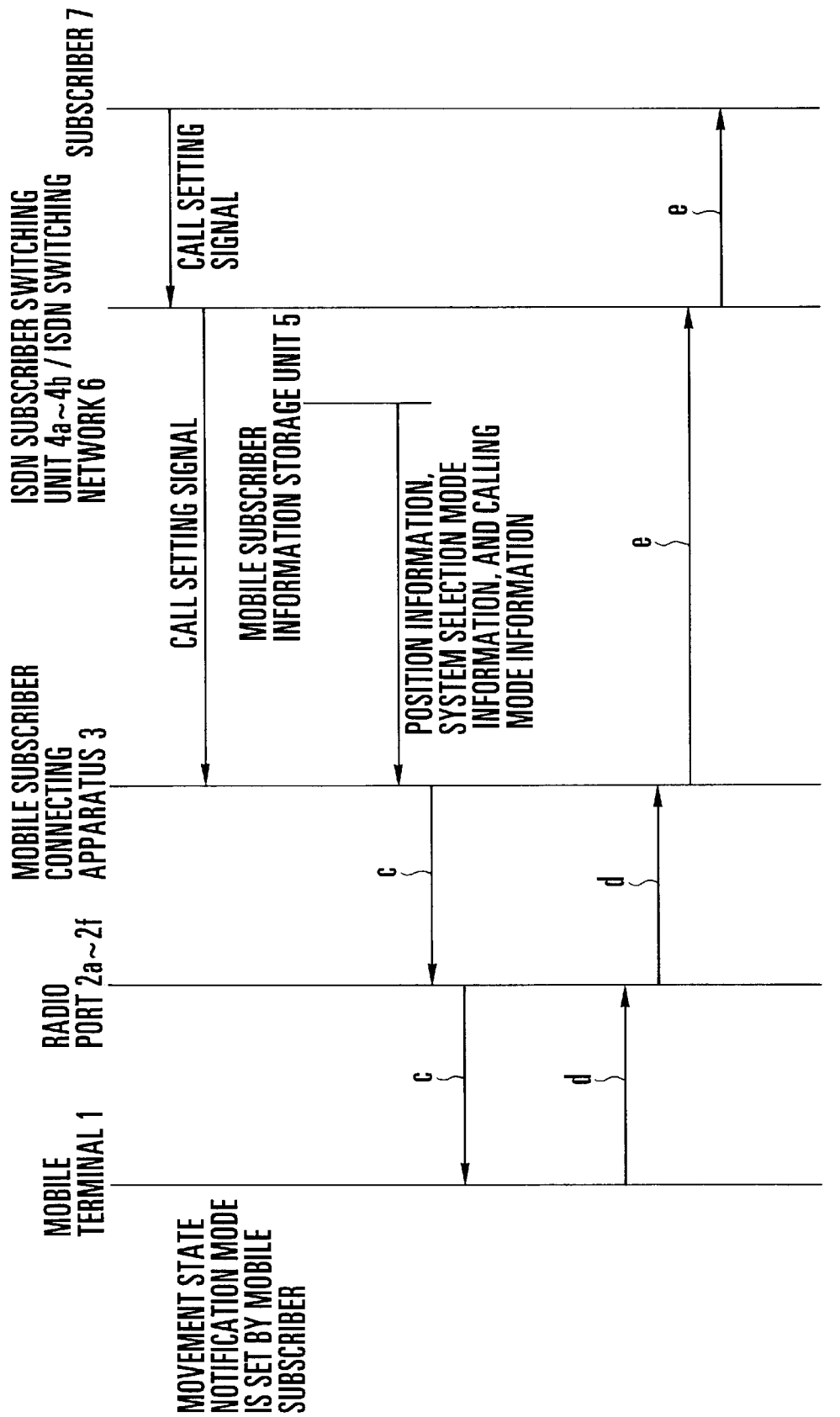
FIG. 3 is a view showing a sequence of radio calling to be performed when a mobile terminal is set in a movement state notification mode according to the second embodiment of the present invention.

FIG. 3 shows a sequence of operations according to the second embodiment which is to be performed when the mobile terminal 1 receives a terminating call from a subscriber 7 while the mobile terminal 1 is moving at a high speed, and the calling mode is updated.

Referring to FIG. 3, upon reception of a call setting signal from the subscriber 7 through an ISDN switching network 6 and ISDN subscriber switching units 4a and 4b, a mobile subscriber connecting apparatus 3 reads out the position information, system selection mode information, and calling mode information of the mobile terminal 1 from a mobile subscriber information storage unit 5, and analyzes them. When the system selection mode of the mobile terminal 1 is set to the low-speed mobile communication system mode, and the calling mode is set to the wide-area calling mode, the mobile subscriber connecting apparatus 3 transmits a call signal c to radio ports 2a to 2f belonging to the low-speed mobile communication system.

Assume that the mobile terminal 1 is set in the movement state notification mode by the mobile subscriber. In this case, upon reception of the call signal c, the mobile terminal 1 transmits, to the radio port 2f belonging to the low-speed mobile communication system, a terminating call response signal d to which movement state information indicating that the terminal is moving at a high speed is added.

Upon reception of the terminating call response signal d from the mobile terminal 1, the mobile subscriber connecting apparatus 3 analyzes the movement state information added to the terminating call response signal d. If the movement state information indicates that the terminal is moving at a high speed, the mobile subscriber connecting apparatus 3 transmits, to the subscriber 7, a speech announcement signal or message information signal e for notifying that the mobile subscriber is moving at a high speed, through the ISDN switching network 6 and the ISDN subscriber switching units 4a and 4b.

Assume that the system selection mode is set to the low-speed mobile communication system mode, and the mobile subscriber starts to move at a high speed while the calling mode is set to the narrow-area calling mode. In this case, the calling mode information of the mobile terminal 1 which is stored in the mobile subscriber information storage unit 5 is not updated. For this reason, even if a terminating call is received from the subscriber 7, the mobile subscriber connecting apparatus 3 does not perform wide-area calling to the mobile terminal 1, but transmits the call signal c to the mobile terminal 1 through the radio ports 2a and 2b in accordance with the latest position information, system selection mode information, and calling mode information of the mobile terminal 1 which are stored in the mobile subscriber information storage unit 5.

Assume that the mobile terminal 1 has received the call signal c. In this case, if the mobile subscriber has set the movement state notification mode, the mobile terminal 1 can add movement state information to the terminating call response signal d and notify the subscriber 7 that the mobile subscriber is moving at a high speed. If, however, the mobile subscriber has not set the movement state notification mode, the mobile terminal 1 does not add movement state information to the terminating call response signal d. For this reason, even if the mobile subscriber connecting apparatus 3 receives the terminating call response signal d, the apparatus cannot notify the subscriber 7 that the mobile subscriber is moving at a high speed.

FIG. 4 shows a sequence of system selection mode update processing according to the third embodiment which is to be performed when the mobile terminal 1 detects a change in moving speed.

Referring to FIG. 4, when the system selection mode of the mobile terminal 1 is set to the second communication mode, and it is determined that the mobile terminal 1 is moving at a low speed, the mobile terminal 1 notifies the mobile subscriber, by speech or on the display unit of the terminal, that the system selection mode can be switched to the first communication mode.

When the mobile subscriber switches the system selection mode of the mobile terminal 1 to the first communication mode in response to this notification, the mobile terminal 1 transmits a position registration request signal a1 having the calling mode information of the terminal added thereto to a radio port 2a belonging to the low-speed mobile communication system.

Upon reception of the position registration request signal a1 from the mobile terminal 1, a mobile subscriber connecting apparatus 3 updates the position information, system selection mode information, and calling mode information of the mobile terminal 1, which are stored in the mobile subscriber information storage unit 5, on the basis of the radio port which has relayed the position registration request signal a1 and the calling mode information added to the position registration request signal a1. The system selection mode is then updated to the first communication mode.

When the system selection mode of the mobile terminal 1 is set to the first communication mode, and it is determined that the terminal is moving at a high speed, the mobile terminal 1 notifies the mobile subscriber, by speech or on the display unit of the terminal, that the system selection mode can be switched to the second communication mode.

When the mobile subscriber switches the system selection mode of the mobile terminal 1 to the second communication mode in response to this notification, the mobile terminal 1 transmits a position registration request signal a2 having the calling mode information of the terminal added thereto to a radio port 2f belonging to the high-speed mobile communication system.

Upon reception of the position registration request signal a2 from the mobile terminal 1, the mobile subscriber connecting apparatus 3 updates the position information, system mode information, and calling mode information of the mobile terminal 1, which are stored in a mobile subscriber information storage unit 5, in accordance with the radio port which has relayed the position registration request signal a2 and the calling mode information added to the position registration request signal a2. The system selection mode is then updated to the second communication mode.

Figure 5:
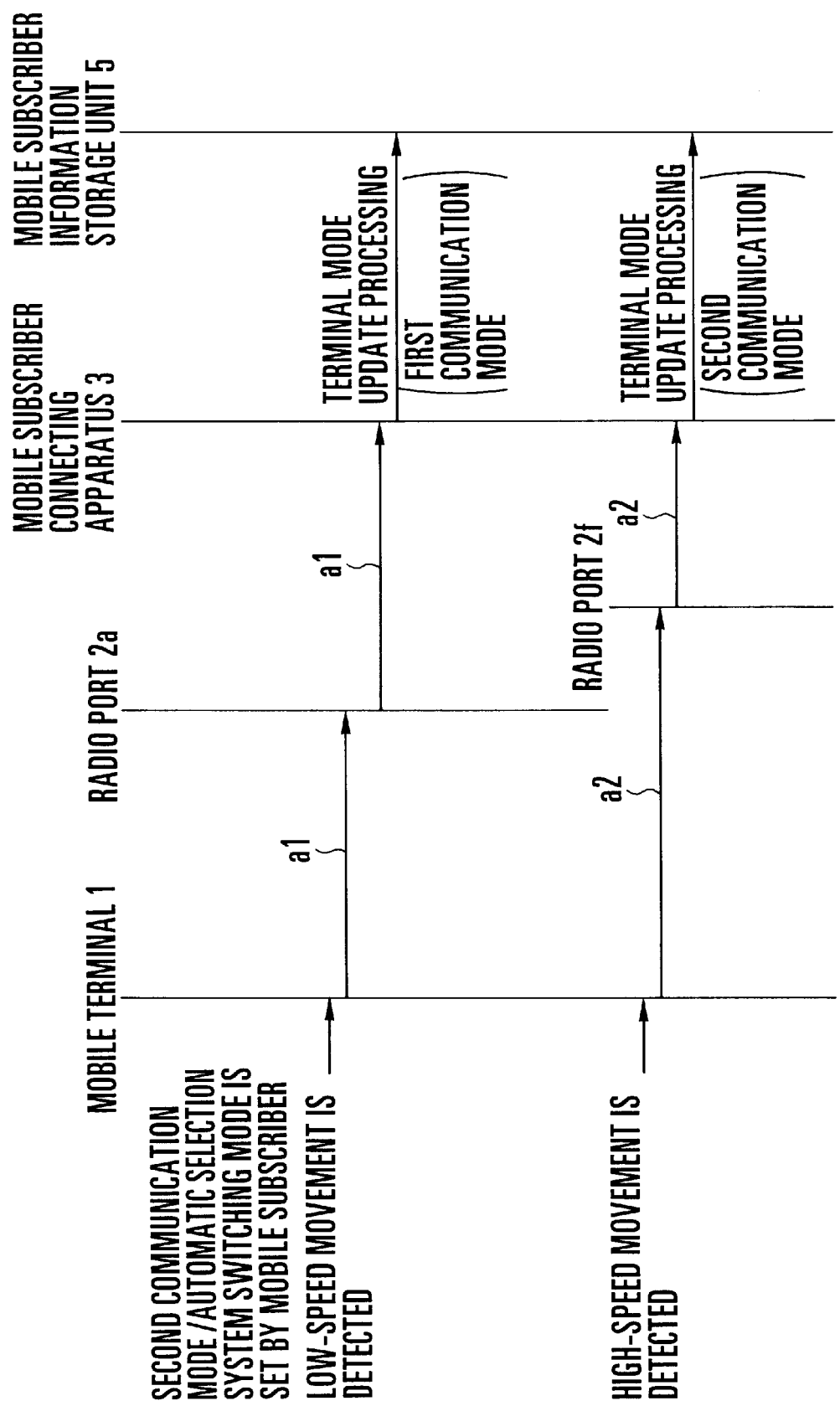
FIG. 5 is a view showing a sequence of system selection mode update processing according to the fourth embodiment of the present invention which is to be performed when the mobile terminal set in an automatic selection system switching mode detects a change in moving speed.

FIG. 5 shows a sequence of system selection mode update processing according to the fourth embodiment which is to be performed when the mobile terminal 1 set in the automatic selection system switching mode detects a change in moving speed. Assume that in the fourth embodiment, the mobile subscriber has set the mobile terminal 1 in the automatic selection system switching mode.

Referring to FIG. 5, when the system selection mode is set to the second communication mode, and it is determined that the mobile terminal 1 is moving at a low speed, the mobile terminal 1 autonomously switches the system selection mode to the first communication mode. At the same time, the mobile terminal 1 transmits a position registration request signal a1 having the calling mode information of the terminal added thereto to a radio port 2a belonging to the low-speed mobile communication system.

Upon reception of the position registration request signal a1 from the mobile terminal 1, a mobile subscriber connecting apparatus 3 updates the position information, system selection mode information, and calling mode information of the mobile terminal 1, which are stored in a mobile subscriber information storage unit 5, on the basis of the radio port which has relayed the position registration request signal a1 and the calling mode information added to the position registration request signal a1. The system selection mode is then updated to the first communication mode.

Assume that the mobile subscriber has set the mobile terminal 1 in the automatic selection system switching mode, as in the above case. In this case, when the system selection mode is set to the first communication mode, and it is determined that the mobile terminal 1 is moving at a high speed, the mobile terminal 1 autonomously switches the system selection mode of the terminal to the second communication mode. At the same time, the mobile terminal 1 transmits a position registration request signal a2 having the calling mode information of the terminal added thereto to a radio port 2f belonging to the high-speed mobile communication system.

Upon reception of the position registration request signal a2 from the mobile terminal 1, the mobile subscriber connecting apparatus 3 updates the position information, system selection mode information, and calling mode information of the mobile terminal 1, which are stored in the mobile subscriber information storage unit 5, on the basis of the radio port which has relayed the position registration request signal a2 and the calling mode information added to the position registration request signal a2. The system selection mode is then updated to the second communication mode.

Figure 6:
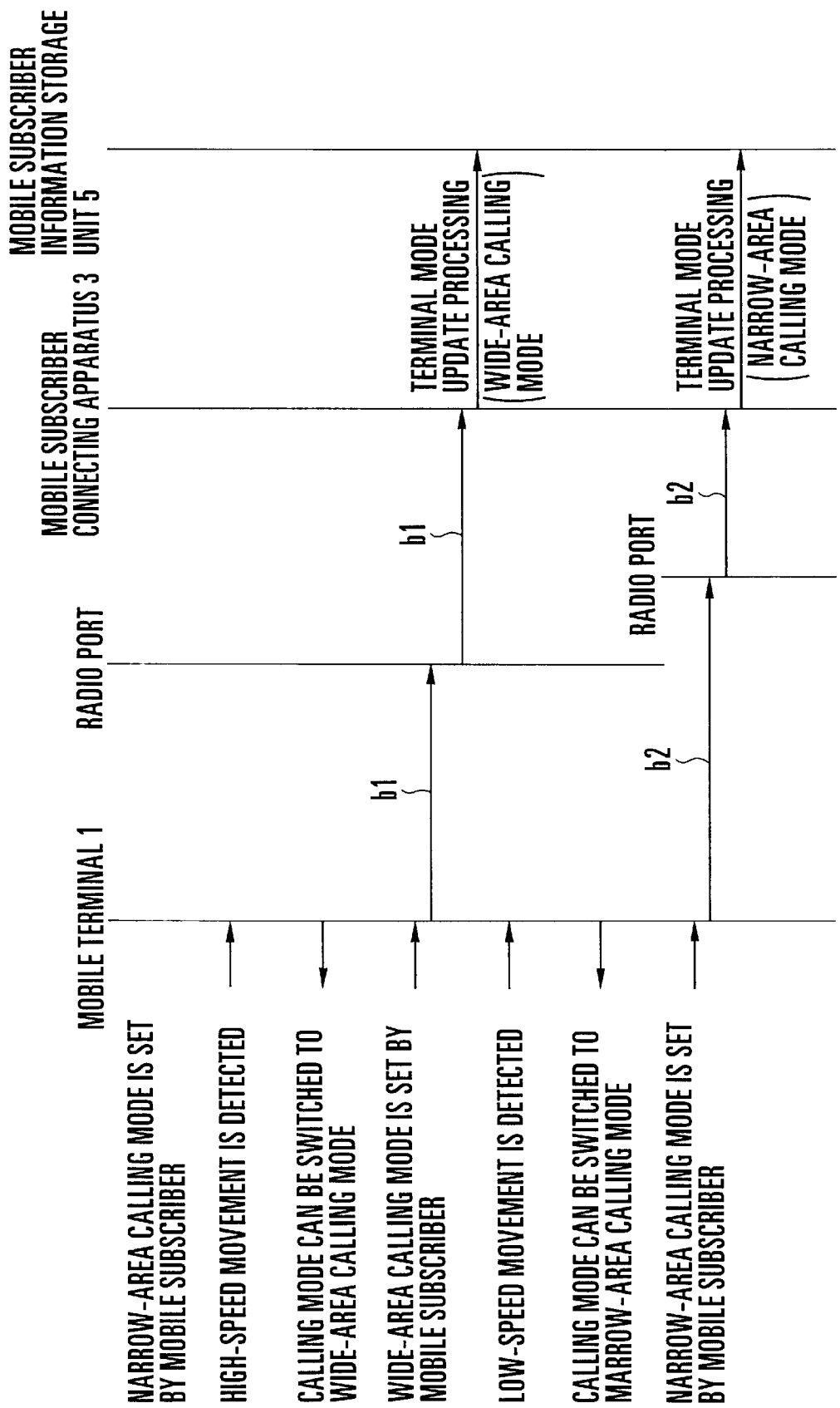
FIG. 6 is a view showing a sequence of calling mode update processing according to the fifth embodiment of the present invention which is to be performed when the mobile terminal detects a change in moving speed.

FIG. 6 shows a sequence of calling mode update processing according to the fifth embodiment which is to be performed when the mobile terminal 1 detects a change in moving speed.

Referring to FIG. 6, when the calling mode of the mobile terminal 1 is set to the narrow-area calling mode, and it is determined that the mobile terminal 1 is moving at a high speed, the mobile terminal 1 notifies the mobile subscriber, by speech or on the display unit of the terminal, that the calling mode can be switched to the wide-area calling mode.

When the mobile subscriber switches the calling mode of the mobile terminal 1 to the wide-area calling in response to this notification, the mobile terminal 1 transmits, to a mobile subscriber connecting apparatus 3, a calling mode registration signal b1 indicating that the terminal is set in the wide-area calling mode, through a radio port belonging to the currently selected mobile communication system. Upon reception of the calling mode registration signal b1 from the mobile terminal 1, the mobile subscriber connecting apparatus 3 updates the calling mode information of the mobile terminal 1, which is stored in a mobile subscriber information storage unit 5, to the wide-area calling mode.

When the calling mode of the mobile terminal 1 is set to the wide-area calling, and it is determined that the mobile terminal 1 is moving at a low speed, the mobile terminal 1 notifies the mobile subscriber, by speech or on the display unit of the terminal that the calling mode can be switched to the narrow-area calling mode.

When the mobile subscriber switches the calling mode of the mobile terminal 1 to the narrow-area calling in response to this notification, the mobile terminal 1 transmits, to the mobile subscriber connecting apparatus 3, a calling mode registration signal b2 indicting that the terminal is set in the narrow-area calling mode, through a radio port belonging to the currently selected mobile communication system and zone. Upon reception of the calling mode registration signal b2 from the mobile terminal 1, the mobile subscriber connecting apparatus 3 updates the calling mode information of the mobile terminal 1, which is stored in the mobile subscriber information storage unit 5, to the narrow-area calling mode.

Figure 7:
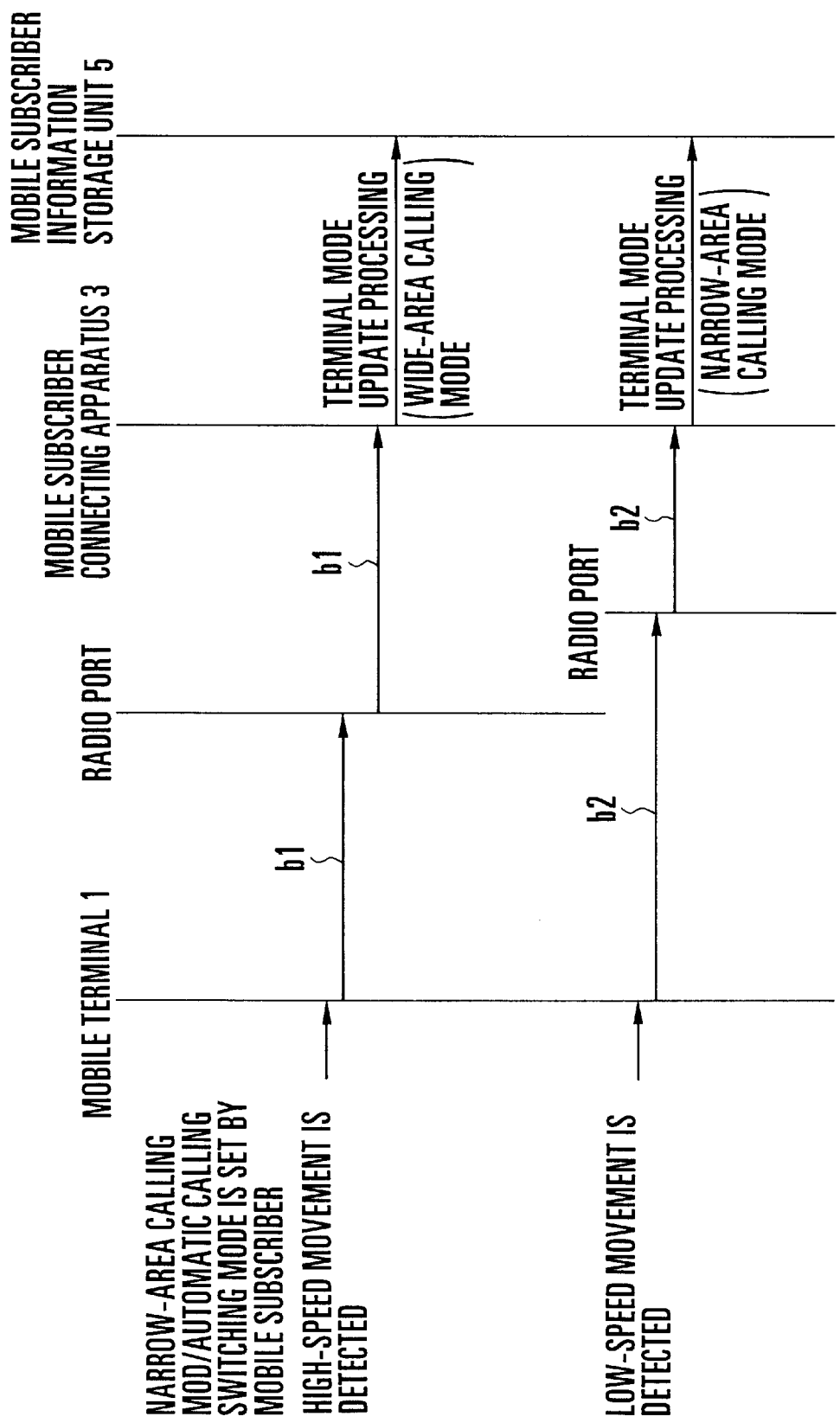
FIG. 7 is a view showing a sequence of calling mode update processing according to the sixth embodiment of the present invention which is to be performed when the mobile terminal set in an automatic calling switching mode detects a change in moving speed.

FIG. 7 shows a sequence of calling mode update processing according to the sixth embodiment which is to be performed when the mobile terminal 1 set in the automatic calling switching mode detects a change in moving speed. Assume that the mobile subscriber has set the mobile terminal 1 in the automatic calling switching mode.

Referring to FIG. 7, when the calling mode is set to the narrow-area calling mode, and it is determined that the mobile terminal 1 is moving at a high speed, the mobile terminal 1 autonomously switches the calling mode to the wide-area calling mode. At the same time, the mobile terminal 1 transmits, to a mobile subscriber connecting apparatus 3, a calling mode registration signal b1 indicating that the terminal is set in the wide-area calling mode, through a radio port belonging to the mobile communication system currently selected by the system selection mode. Upon reception of the calling mode registration signal b1 from the mobile terminal 1, the mobile subscriber connecting apparatus 3 updates the calling mode information of the mobile terminal 1, which is stored in a mobile subscriber information storage unit 5, to the wide-area calling mode information.

Assume that the mobile subscriber has set the mobile terminal 1 in the automatic calling switching mode, as in the above case. In this case, when the calling mode is set to the wide-area calling mode, and it is determined that the mobile terminal 1 is moving at a low speed, the mobile terminal 1 autonomously switches the calling mode of the terminal to the narrow-area calling mode. At the same time, the mobile terminal 1 transmits, to the mobile subscriber connecting apparatus 3, a calling mode registration signal b2 indicating that the terminal is set in the narrow-area calling mode, through a radio port belonging to the mobile communication system currently selected by the system selection mode. Upon reception of the calling mode registration signal b2 from the mobile terminal 1, the mobile subscriber connecting apparatus 3 causes the mobile subscriber information storage unit 5 to update the calling mode of the mobile terminal 1 to the narrow-area calling mode information.

Figure 8:
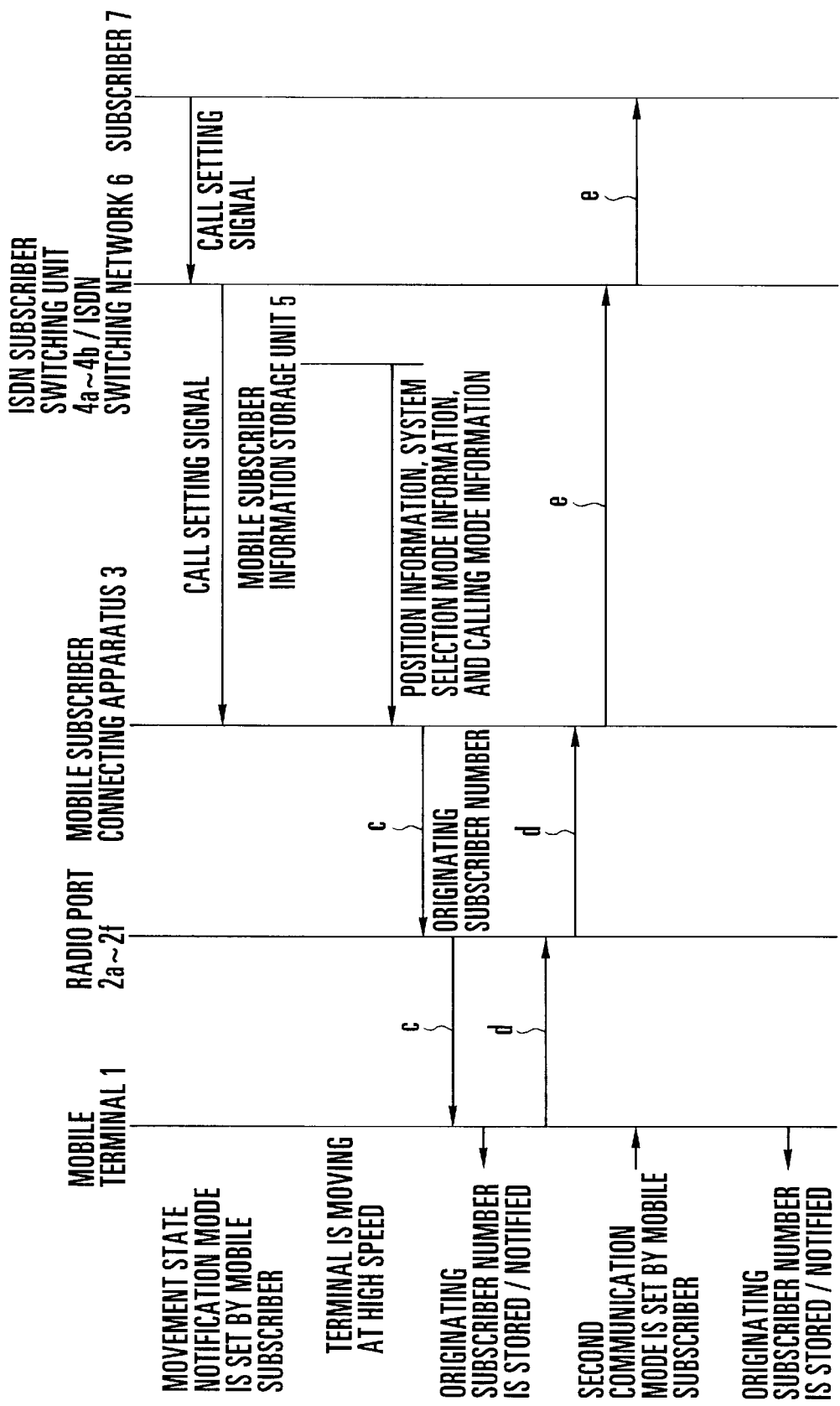
FIG. 8 is a view showing a sequence of radio calling according to the seventh embodiment of the present invention which is to be performed when the mobile terminal has functions of storing an originating subscriber number and notifying the mobile subscriber of the number, and is set in the movement state notification mode.

FIG. 8 shows a sequence of radio calling according to the seventh embodiment which is to be performed when the mobile terminal 1 has a means for storing an originating subscriber number and notifying the mobile subscriber of the number, and is set in the movement state notification mode. In this embodiment, the method of registering the position of the mobile terminal 1 and the method of updating the system selection mode information and calling mode information of the mobile terminal 1 are the same as those in the above embodiments. Assume that the mobile terminal 1 is set in the low-speed mobile communication system mode, moving at a high speed, and set in the movement state notification mode by the mobile subscriber.

Referring to FIG. 8, upon reception of a call setting signal for the mobile terminal 1 from a subscriber 7 through an ISDN switching network 6 and ISDN subscriber switching units 4a and 4b, a mobile subscriber connecting apparatus 3 reads out the position information, system selection mode information, and calling mode information of the mobile terminal 1 from a mobile subscriber information storage unit 5, and analyzes them. When the system selection mode of the mobile terminal 1 is the first communication mode, the mobile subscriber connecting apparatus 3 transmits a call signal c having originating subscriber number information added thereto to narrow-/wide-area radio ports 2a to 2f in accordance with the calling mode of the mobile terminal 1.

Upon reception of the call signal c, the mobile terminal 1 displays the originating subscriber number added to the received call signal c on the display unit, and stores the originating subscriber number in the storage unit. At the same time, the mobile terminal 1 transmits, to the radio port 2a belonging to the low-speed mobile communication system, a terminating call response signal d to which movement state information indicating that the terminal is moving at a high speed is added.

Upon reception of the terminating call response signal d from the mobile terminal 1, the mobile subscriber connecting apparatus 3 analyzes the movement state information contained in the terminating call response signal d. If the movement state information indicates that the terminal is moving at a high speed, the mobile subscriber connecting apparatus 3 transmits, to the subscriber 7, a speech announcement signal or message information signal e for notifying that the mobile subscriber is moving at a high speed, through the ISDN switching network 6 and the ISDN subscriber switching units 4a and 4b.

When the mobile subscriber switches the system selection mode from the first communication mode to the second communication mode, or the mobile terminal 1 detects that the moving speed of the mobile subscriber has fallen in the range allowing low-speed mobile communication, the mobile terminal 1 displays the originating subscriber number stored in the storage unit on the display unit, and attracts the attention of the mobile subscriber by speech or the like, thereby notifying the mobile subscriber that a terminating call has been received during high-speed movement. With this operation, the mobile subscriber recognizes the subscriber number of the subscriber 7, who has sent the terminating call during high-speed movement, and can immediately generate an originating call to the subscriber 7 if he/she determines that it is necessary.

Figure 9:
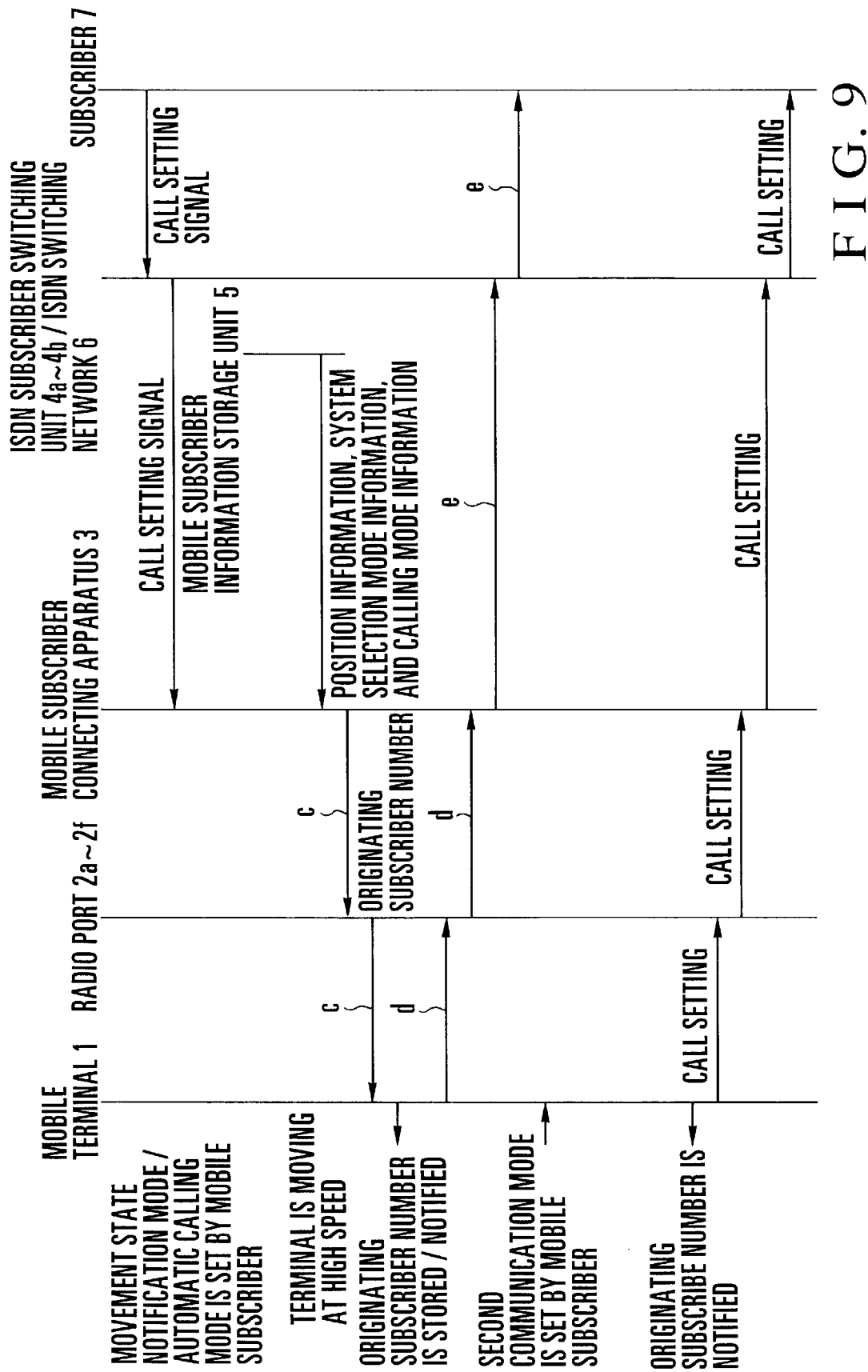
FIG. 9 is a view showing a sequence of radio calling according to the eighth embodiment of the present invention which is to be performed when the mobile terminal has functions of storing an originating subscriber number and notifying the mobile subscriber of the number, and is set in the movement state notification mode and an automatic originating mode.

FIG. 9 shows a sequence of radio calling according to the eight embodiment which is to be performed when the mobile terminal 1 has a means for storing an originating subscriber number in the storage unit and notifying the mobile subscriber of the subscriber number, and is set in the movement state notification mode and the automatic calling mode. In this embodiment, the method of registering the position of the mobile terminal 1 and the method of updating the system selection mode information and calling mode information of the mobile terminal 1 are the same as those in the above embodiments. Assume that the mobile terminal 1 is set in the first communication mode, moving at a high speed, and set in the movement state notification mode and the automatic calling mode by the mobile subscriber.

Referring to FIG. 9, upon reception of a call setting signal for the mobile terminal 1 from a subscriber 7 through an ISDN switching network 6 and ISDN subscriber switching units 4a and 4b, a mobile subscriber connecting apparatus 3 reads out the position information, system selection mode information, and calling mode information of the mobile terminal 1 from the mobile subscriber information storage unit 5, and analyzes them. When the system selection mode of the mobile terminal 1 is the first communication mode, the mobile subscriber connecting apparatus 3 transmits a call signal c having originating subscriber number information added thereto to narrow-/wide-area radio ports 2a to 2f in accordance with the calling mode of the mobile terminal 1.

Upon reception of the call signal c, the mobile terminal 1 displays the originating subscriber number added to the call signal c on the display unit, and stores the originating subscriber number in the storage unit. At the same time, the mobile terminal 1 transmits, to the radio port 2a belonging to the low-speed mobile communication system, a terminating call response signal d to which movement state information indicating that the terminal is moving at a high speed is added.

Upon reception of the terminating call response signal d from the mobile terminal 1, the mobile subscriber connecting apparatus 3 analyzes the movement state information added to the terminating call response signal d. If the movement state information indicates that the terminal is moving at a high speed, the mobile subscriber connecting apparatus 3, to the subscriber 7, a speech announcement signal or message information signal e for notifying that the mobile subscriber is moving at a high speed, through the ISDN switching network 6 and the ISDN subscriber switching units 4a and 4b.

When the mobile subscriber switches the system selection mode from the first communication mode to the second communication mode in this state, or the mobile terminal 1 detects that the moving speed of the mobile subscriber has fallen in the range allowing low-speed mobile communication, the mobile terminal 1 displays the originating subscriber number stored in the storage unit on the display unit, and attracts the attention of the mobile subscriber by speech or the like, thereby notifying the mobile subscriber that a terminating call has been received during high-speed movement. At the same, the mobile terminal 1 automatically generates an originating call for the originating subscriber number stored in the storage unit.

FIG. 9 shows sequence of the ninth embodiment to explain another radio calling method. Assume that the method of registering the position of the mobile terminal 1 and the method of updating the system selection mode information and calling mode information of the mobile terminal 1 are the same as those in the above embodiments. Assume also that the mobile terminal 1 is set in the first communication mode, moving at a high speed, and set in the movement state notification mode by the mobile subscriber.

Referring to FIG. 9, upon reception of the a call setting signal for the mobile terminal 1 from a subscriber 7 through an ISDN switching network 6 and ISDN subscriber switching units 4a and 4b, the mobile subscriber connecting apparatus 3 reads out the position information, system selection mode information, and calling mode information of the mobile terminal 1 from the mobile subscriber information storage unit 5, and analyzes them. When the system selection mode of the mobile terminal 1 is the first communication mode, the mobile subscriber connecting apparatus 3 determines, on the basis of the calling mode of the mobile terminal 1, one of narrow-/wide-area radio ports 2a to 2f which is to be activated. The mobile subscriber connecting apparatus 3 encrypts the originating subscriber number information of the subscriber 7 by performing a predetermined mathematical operation based on a predetermined algorithm, and transmits, to the determined radio port, a call signal c to which the encrypted originating subscriber number information is added.

Upon reception of the call signal c, the mobile terminal 1 decrypts the encrypted originating subscriber number information contained in the received call signal c by performing a predetermined mathematical operation based on a predetermined algorithm. The decrypted originating subscriber number is displayed on the display unit and stored in the storage unit. At the same time, the mobile terminal 1 transmits, to the radio port 2a belonging to the low-speed mobile communication system and its zone, a terminating call response signal d to which movement state information indicating that the terminal is moving at a high speed is added.

Upon reception of the terminating call response signal d from the mobile terminal 1, the mobile subscriber connecting apparatus 3 analyzes the movement state information contained in the terminating call response signal d. If the movement state information indicates that the terminal is moving at a high speed, the mobile subscriber connecting apparatus 3 transmits, to the subscriber 7, a speech announcement signal or message information signal e for notifying that the mobile subscriber is moving at a high speed, through the ISDN switching network 6 and the ISDN subscriber switching units 4a and 4b.

When the mobile subscriber switches the system selection mode from the first communication mode to the second communication mode in this state, or the mobile terminal 1 detects that the moving speed of the mobile subscriber has fallen in the range allowing low-speed mobile communication, the mobile terminal 1 displays the originating subscriber number stored in the storage unit on the display unit, and attracts the attention of the mobile subscriber by speech or the like, thereby notifying the mobile subscriber that a terminating call has been received during high-speed movement. With this operation, the mobile subscriber recognizes the subscriber number of the subscriber 7, who has sent the terminating call during high-speed movement, and can immediately generate an originating call to the subscriber 7 if he/she determines that it is necessary.

When the mobile subscriber has sent the mobile terminal 1 in the automatic originating mode in advance, the mobile terminal 1 notifies the mobile subscriber that a terminating call has been received during high-speed movement, and at the same time, automatically generates an originating call the originating subscriber number stored in the storage unit.

Figure 10:
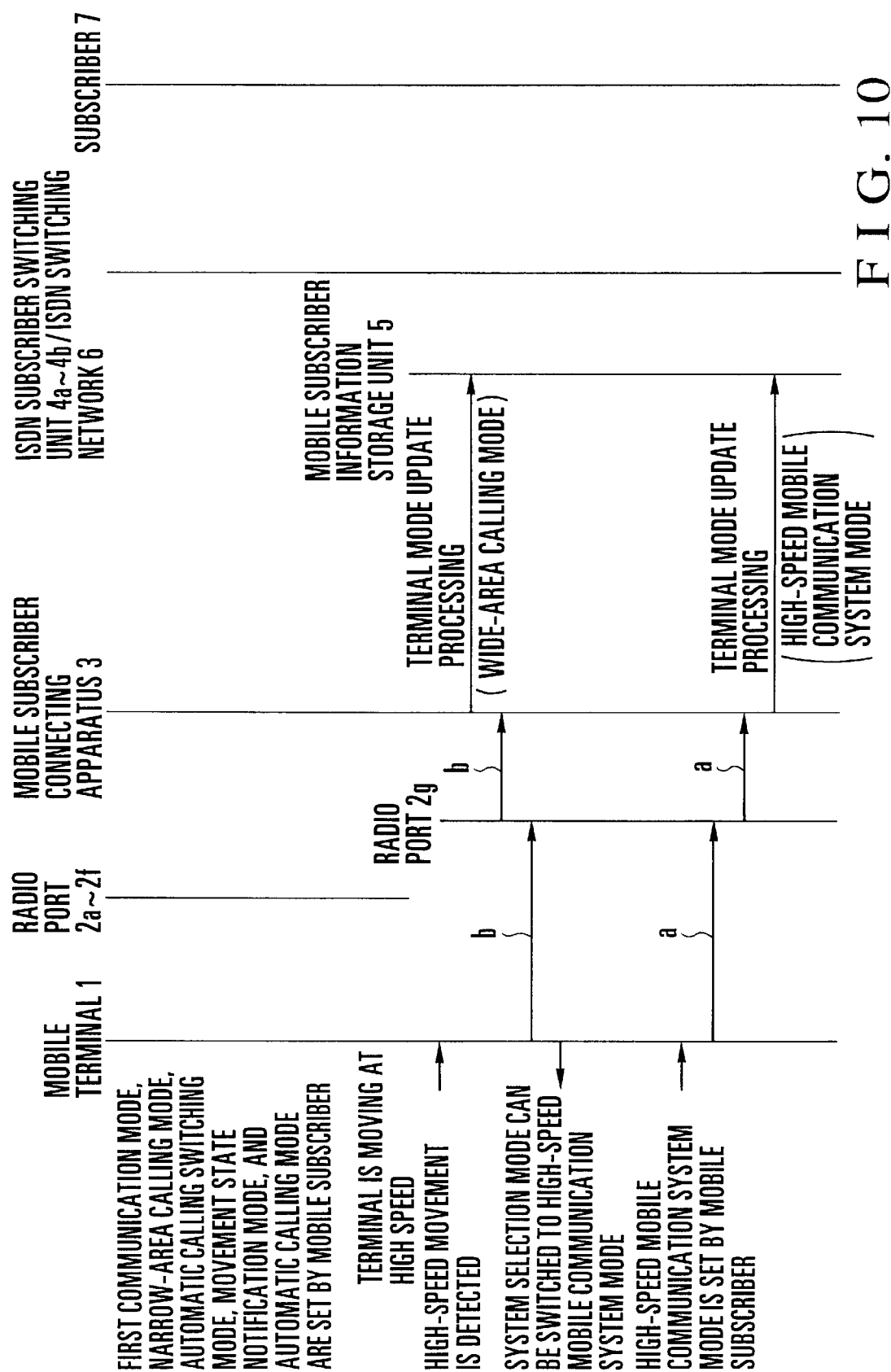
FIG. 10 is a view showing sequences of system selection mode update processing and calling mode update processing according to the ninth embodiment of the present invention which are to be performed when the mobile terminal set in a first communication mode, a narrow-area calling mode, the automatic calling switching mode, the movement state notification mode, and the automatic originating mode detects a change in moving speed.
Figure 11:
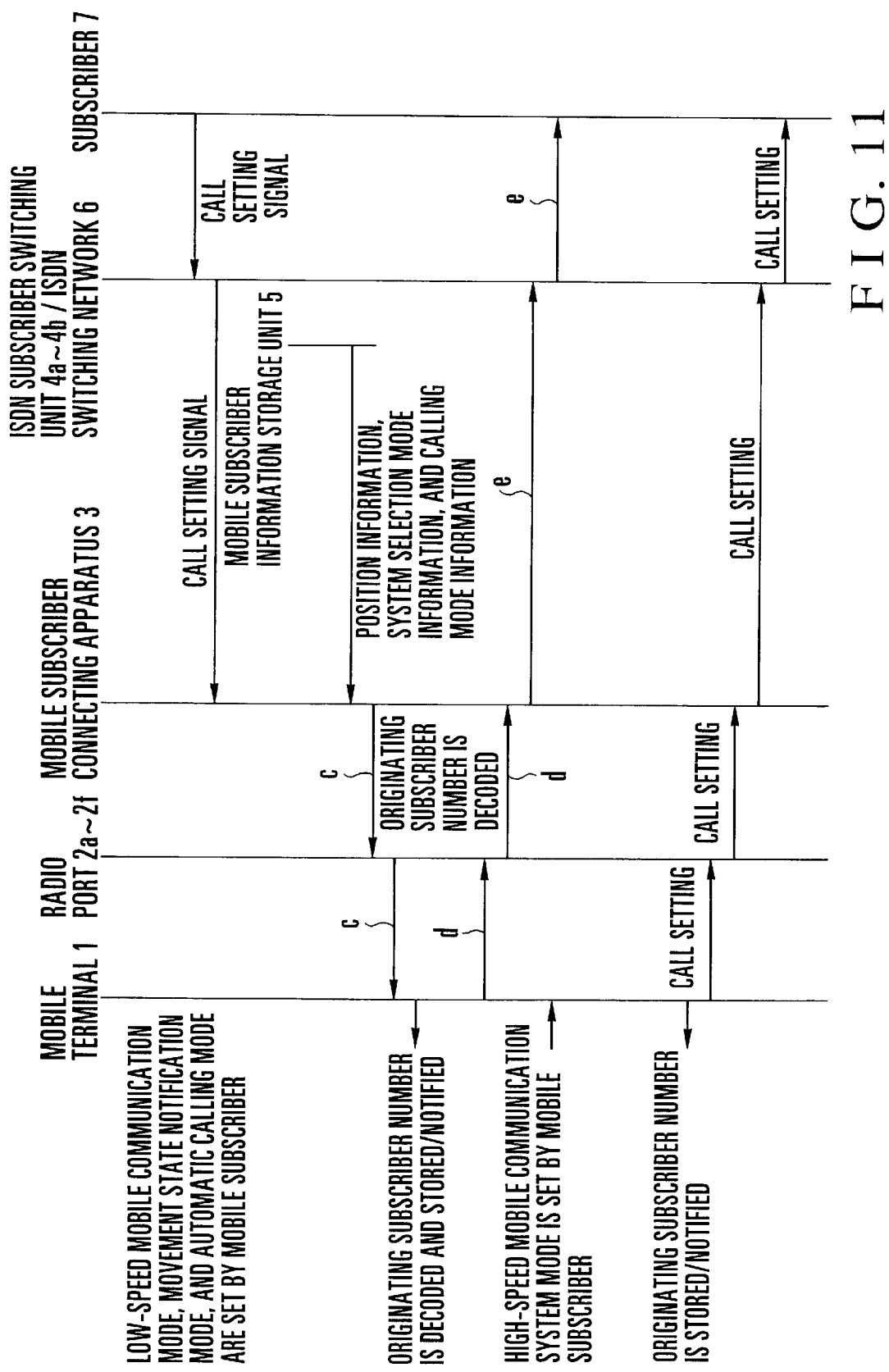
FIG. 11 is a view showing a sequence of radio calling to be performed when the mobile terminal and a mobile subscriber connecting apparatus have functions of encrypting and decrypting an originating subscriber number, and the mobile terminal is set in the first communication mode, a wide-area calling mode, the movement state notification mode, and the automatic originating mode.

FIG. 10 shows sequences of system selection mode updating processing and calling mode update processing according to the 10th embodiment which are to be performed when the mobile terminal 1 is set in the first communication mode, the narrow-area calling mode, the automatic calling switching mode, the movement state notification mode, and the automatic calling mode.

Assume that the mobile terminal 1 is set in the first communication mode and the narrow-area calling mode, and set in the automatic call switching mode, the movement information notification mode, and the automatic calling mode by the mobile subscriber. In addition, assume that the system selection mode information and calling mode information of the mobile terminal 1, which are stored in a mobile subscriber information storage unit 5, are registered as the first communication mode and the narrow-area calling mode, respectively.

Referring to FIG. 10, upon detecting that its moving speed has changed from a low speed to a high speed, the mobile terminal 1 autonomously switches the calling mode to the wide-area calling mode. In addition, the mobile terminal 1 transmits, to the mobile subscriber connecting apparatus 3, a calling mode registration signal b indicating that the terminal is set in the wide-area calling mode, through a radio port belonging to the low-speed mobile communication system. Upon reception of the calling mode registration signal b from the mobile terminal 1, the mobile subscriber connecting apparatus 3 updates the calling mode information of the mobile terminal 1, which is stored in the mobile subscriber information storage unit 5, to the wide-area calling mode information. At the same time, the mobile terminal 1 notifies the mobile subscriber, by speech or on the display unit of the terminal, that the system selection mode can be switched to the second communication mode.

When the mobile subscriber switches the system selection mode of the mobile terminal 1 to the second communication mode in response to this notification, the mobile terminal 1 transmits a position registration request signal a having calling mode information added thereto to a radio port 2g belonging to the high-speed mobile communication system. Upon reception of the position registration request signal a from the mobile terminal 1, the mobile subscriber connecting apparatus 3 updates the position information of the mobile terminal 1, which is stored in the mobile subscriber information storage unit 5, on the basis of the radio port which has relayed the position registration request signal a and the calling mode information contained in the position registration request signal a. The mobile subscriber connecting apparatus 3 also updates the system selection mode to the second communication mode, and the calling mode information to the wide-area calling mode.

Assume that the mobile subscriber does not switch the system selection mode (to the second communication mode) unlike the above case. That is, the mobile terminal 1 is currently set in the low-speed mobile communication system mode and the wide-area calling mode. The corresponding sequence will be described below with reference to FIG. 11.

Upon reception of a call setting signal for the mobile terminal 1 from a subscriber 7 through an ISDN switching network 6 and ISDN subscriber switching units 4a and 4b, the mobile subscriber connecting apparatus 3 reads out the position information, system selection mode information, and calling mode information of the mobile terminal 1 from the mobile subscriber information storage unit 5, and analyzes them. When the system selection mode of the mobile terminal 1 is the low-speed mobile communication system mode, the mobile subscriber connecting apparatus 3 determines, on the basis of the calling mode of the mobile terminal 1, one of radio ports 2a to 2f which is to be activated. The mobile subscriber connecting apparatus 3 then encrypts the originating subscriber number information of the subscriber 7 by performing a mathematical operation based on a predetermined algorithm, and transmits, to the determined radio port, a call signal c to which the encrypted originating subscriber number is added.

Upon reception of the call signal c, the mobile terminal 1 decrypts the encrypted originating subscriber number information contained in the received call signal c by performing a mathematical operation based on a predetermined algorithm. The mobile terminal 1 then displays the decrypted originating subscriber number on the display unit and stores it in the storage unit. At the same time, the mobile terminal 1 transmits, to the radio port 2a belonging to the low-speed mobile communication system, a terminating call response signal d to which movement state information indicating that the terminal is moving at a high speed is added.

Upon reception of the terminating call response signal d from the mobile terminal 1, the mobile subscriber connecting apparatus 3 analyzes the movement state information contained in the terminating call response signal d. When the movement state information indicates that the terminal is moving at a high speed, the mobile subscriber connecting apparatus 3 transmits, to the subscriber 7, a speech announcement signal or message information signal e for notifying that the mobile subscriber is moving at a high speed, through the ISDN switching network 6 and the ISDN subscriber switching units 4a and 4b.

When the mobile subscriber switches the system selection mode from the first communication mode to the second communication mode in this state, or the mobile terminal 1 detects that the moving speed of the mobile subscriber has fallen in the range allowing low-speed mobile communication, the mobile terminal 1 displays the originating subscriber number stored in the storage unit on the display unit, and attracts the attention of the mobile subscriber by speech or the like, thereby notifying the mobile subscriber that a terminating call has been received during high-speed movement. At the same time, the mobile terminal 1 automatically generates an originating call the originating subscriber number stored in the storage unit.

As has been described above, according to the present invention, since there is no need to install a dedicated calling radio base station for calling a mobile terminal moving at a high speed, no extra manufacturing and installation costs are required, and no radio channel control and protocol control for a dedicated calling radio base station are required.

According to the present invention, a mobile terminal has the wide- and narrow-area calling modes, and the mobile subscriber sets a calling mode. Alternatively, the mobile terminal detects a change in moving speed, and automatically sets a calling mode. The mobile terminal then transmits a calling mode registration signal to a radio port belonging to the mobile communication system selected at this time. In response to the calling mode registration signal, the mobile subscriber connecting apparatus causes the mobile subscriber information storage unit to store the calling mode information of the mobile terminal. When the calling mode of the terminating mobile terminal is the wide-area calling mode, a call signal is transmitted to a wide-area radio port group. This arrangement eliminates the necessity of a dedicated calling radio base station.

According to the present invention, when the mobile terminal is set in the low-speed mobile communication system mode, even if the terminal is moving at a high speed, the terminal can notify the originating subscriber, at least, that the terminal is moving at a high speed.

This notification is realized for the following reason. In the present invention, when the system selection mode of the mobile terminal is set to the low-speed mobile communication system mode, and the movement state notification mode is set while the mobile subscriber is moving at a high speed, the terminal transmits, to a radio port belonging to the low-speed mobile communication system, a terminating call response signal to which movement state information indicating that the mobile subscriber is moving at a high speed is added, upon reception of a call signal. Upon reception of this terminating call response signal, the mobile subscriber connecting apparatus analyzes the movement state information contained in the terminating call response signal. If the information indicates that the mobile terminal is moving at a high speed, the mobile subscriber connecting apparatus notifies the originating subscriber that the mobile subscriber is moving at a high speed. With this operation, the originating subscriber can know the movement state of the mobile terminal.

In addition, according to the present invention, since the mobile terminal displays an originating subscriber number, the mobile subscriber can recognize the originating subscriber. The mobile subscriber can therefore immediately contact the originating subscriber by setting the system selection mode of the mobile terminal to the high-speed mobile communication system mode, if the mobile subscriber wants to urgently contact the originating subscriber.

Furthermore, according to the present invention, if urgent contact is not required, the mobile terminal may store the originating subscriber number. When the mobile subscriber switches the system selection mode from the low-speed mobile communication system mode to the high-speed mobile communication system mode, or the moving speed of the mobile subscriber falls in the range allowing low-speed mobile communication, the mobile terminal may automatically generate an originating call the stored originating subscriber number. In this manner, the low-charge, low-speed mobile communication system mode may be set. With this operation, the mobile subscriber can automatically communicate with an originating subscriber who has called during high-speed movement.

Moreover, according to the present invention, an optimal mobile communication system and an optimal calling method can be automatically set in accordance with the moving speed of the mobile subscriber regardless of whether the mobile subscriber recognizes the moving speed.

This operation can be realized for the following reason. In the present invention, when the mobile subscriber sets the mobile terminal in the automatic selection system switching mode and the automatic calling switching mode in advance, the mobile terminal autonomously switches the system selection mode of the terminal to the mobile communication system mode suited for the current moving speed of the terminal, and also autonomously switches the calling mode of the terminal to the calling mode suited for the current moving speed of the terminal. The mobile terminal then transmits a position registration request signal having the calling mode information of the terminal thereto to a radio port belonging to the mobile communication system selected by the system selection mode. Upon reception of the position registration request signal from the mobile terminal, the mobile subscriber connecting apparatus updates the position information, system selection mode information, and calling mode information of the mobile terminal, which are stored in the mobile subscriber information storage unit, in accordance with the radio port of the transmission source of the position registration request signal and the calling mode information contained in the position registration request signal.

What is claimed is:

1. A mobile communication system comprising a plurality of mobile terminals, a plurality of radio base stations belonging to low- and high-speed mobile communication systems and serving to perform radio communication with said mobile terminals, and a mobile subscriber connecting apparatus to which said radio base stations are connected, said mobile communication system using both a first communication mode including said low-speed mobile communication system and a micro-cell zone and a second communication mode including said high-speed mobile communication system and a macro-cell zone, said mobile terminal including
  first mode selecting means for selecting and setting one of the first and second communication modes constituting a system selection mode,
  communication control means for performing position registration and an originating/terminating operation of said terminal in the communication mode selected by said first mode selecting means,
  second mode selecting means for selecting one of a narrow-area calling mode of receiving a call in a narrow calling area constituted by at least one of said radio ports belonging to said high-speed mobile communication system or said low-speed mobile communication system, and a wide-area calling mode of receiving a call in a plurality of narrow calling areas,
  first transmitting means for, when the calling mode is selected by said second mode selecting means, transmitting a calling mode registration signal to said radio port belonging to said currently selected mobile communication system,
  second transmitting means for, when position registration is to be performed by said communication control means, adding the calling mode selected by said second mode selecting means to a position registration request signal, and transmitting the signal to said radio port belonging to said currently selected mobile communication system,
  third mode selecting means for, when the system selection mode set to the first communication mode, selecting an ON/OFF state of a movement state notification mode of notifying a movement state with respect to a call signal while said mobile terminal is moving at a high speed, and
  terminating call responding means for transmitting, to said radio port belonging to said low-speed mobile communication system, a terminating call response signal to which movement state information indicating that said mobile terminal is moving at a high speed, in response to a received call signal, when the system selection mode is set to the first communication mode, said mobile terminal is moving at a high speed, and the movement state notification mode is set in the ON state, and said mobile subscriber connecting apparatus including
  notifying means for notifying an originating subscriber that said mobile terminal is moving at a high speed, upon reception of a terminating call response signal having movement state information added thereto through said radio base station.

2. A system according to claim 1, further comprising a mobile subscriber information storage unit connected to said mobile subscriber connecting apparatus and serving to store and update subscriber information, position information, movement mode information, and terminating mode information of said mobile terminal.

3. A mobile communication system comprising a plurality of mobile terminals, a plurality of radio base stations belonging to low- and high-speed mobile communication systems and serving to perform radio communication with said mobile terminals, a mobile subscriber connecting apparatus to which said radio ports are connected, and a mobile subscriber information storage unit connected to said mobile subscriber connecting apparatus and serving to store and update subscriber information, position information, movement mode information, and terminating mode information of said mobile terminal, said mobile communication system using both a first communication mode including said low-speed mobile communication system and a micro-cell zone and a second communication mode including said high-speed mobile communication system and a macro-cell zone, said mobile terminal including
  determining means for detecting a moving speed of said terminal, and determining on the basis of a predetermined reference speed that the detected speed is one of high and low speeds,
  first mode selecting means for selecting and setting one of the first and second communication modes constituting a systems selection mode,
  communication control means for performing position registration and an originating/terminating operation of said terminal in the communication mode selected by said first mode selecting means,
  second mode selecting means for selecting one of a narrow-area calling mode of receiving a call in a narrow calling area constituted by at least one of said radio ports belonging to said high-speed mobile communication system or said low-speed mobile communication system, and a wide-area calling mode of receiving a call in a plurality of narrow calling areas,
  first transmitting means for, when the calling mode is selected by said second mode selecting means, transmitting a calling mode registration signal to said radio port belonging to said currently selected mobile communication system,
  second transmitting means for, when position registration is to be performed by said communication control means, adding the calling mode selected by said second mode selecting means to a position registration request signal, and transmitting the signal to said radio port belonging to said currently selected mobile communication system,
  third mode selecting means for, when the system selection mode is set to the first communication mode, selecting an ON/OFF state of a movement state notification mode of notifying a movement state with respect to a call signal while said mobile terminal is moving at a high speed, and
  terminating call responding means for transmitting, to said radio port belonging to said low-speed mobile communication system, a terminating call response signal to which movement state information indicating that said mobile terminal is moving at a high speed, in response to a received call signal, when the system selection mode is set to the first communication mode, said mobile terminal is moving at a high speed, and the movement state notification mode is set in the ON state, and said mobile subscriber connecting apparatus including
  updating means for determining the system selection mode and the calling mode of said mobile terminal, and updating position information, system selection mode information, and calling mode information of said mobile terminal, which are stored in said mobile subscriber information storage unit, on the basis of a position registration request signal having calling mode information added thereto from said mobile terminal, and said radio port which has relayed the position registration request signal, and for, when a calling mode registration signal is received from said mobile terminal, updating calling mode information of said mobile terminal which is stored in said mobile subscriber information storage unit, calling means for, when a terminating signal for said mobile terminal is received, reading out the position information, system selection mode information, and calling mode information of said mobile terminal from said mobile subscriber information storage unit and analyzing the position information, system selection mode information, and calling mode information, and transmitting a call signal to said radio port belonging to said selected mobile communication system and corresponding to the narrow calling area if the calling mode is the narrow-area calling mode, and transmitting a call signal to said radio port belonging to said selected mobile communication system and corresponding to the wide calling area if the calling mode is the wide-area calling mode, and notifying means for, when a terminating call response signal is received from said mobile terminal, analyzing movement state information added to the terminating call response signal, and when the movement state information indicates that said mobile terminal is moving at a high speed, notifying an originating subscriber that said mobile terminal is moving at a high speed.

4. A system according to claim 3, wherein said mobile terminal comprises display means for, when the system selection mode is set to the second communication mode, and it is determined that said terminal is moving at a low speed, displaying information indicating that the system selection mode can be switched to the first communication mode, and for, when the system selection mode is set to the first communication mode, and it is determined that said mobile terminal is moving at a high speed, displaying, by using at least auditory or visual means, information indicating that the system selection mode can be switched to the second communication mode.

5. A system according to claim 3, wherein said mobile terminal comprises fourth mode selecting means for, when it is detected that a moving speed of said terminal has changed from a low speed to a high speed or from a high speed to a low speed, selecting an ON/OFF state of an automatic system switching mode of automatically switching the system selection mode to the second communication mode, if said terminal is moving at a high speed, or switching the system selection mode to the first communication mode, if said terminal is moving at a low speed, and transmitting a position registration request signal to said radio port belonging to said mobile communication system after switching of the mode, and when the automatic system switching mode is set in the ON state by said fourth selecting means, a system switching operation and a position registering operation are automatically performed.

6. A system according to claim 3, wherein said mobile terminal comprises display means for, when the calling mode is set to the narrow-area calling mode, and it is determined that said terminal is moving at a high speed, displaying information indicating that the calling mode can be switched to the wide-area calling mode, and for, when the calling mode is set to the wide-area calling mode, and it is determined that said terminal is moving at a low speed, displaying information indicating that the calling mode can be switched to the narrow-area calling mode.

7. A system according to claim 3, wherein said mobile terminal comprises fourth selecting means for selecting an ON/OFF state of an automatic calling switching mode of automatically switching the calling mode to the wide-area calling mode, when it is detected that the moving speed of said terminal has changed from a low speed to a high speed, and transmitting, to said radio port belonging to said mobile communication system selected by the system selection mode, a calling mode registration signal indicating that the calling mode is switched to the wide-area calling mode, and automatically switching the calling mode to the narrow-area calling mode, when it is determined that the moving speed of said terminal has changed from a high speed to a low speed, and transmitting, to said radio port belonging to said mobile communication system selected by the system selection mode, a calling mode registration signal indicating that the calling mode is switched to the narrow-area calling mode, and when the automatic calling switching mode is set in the ON state by said fourth selecting means, a calling mode switching operation and a calling mode registering operation are automatically performed.

8. A system according to claim 3, wherein said mobile terminal comprises first display means for displaying an originating subscriber number added to a received call signal when said terminal is moving at a high speed, and the movement state notification mode is set in the ON state, storage means for storing the displayed originating subscriber number, and second display means for displaying information indicating reception of a terminating call during high-speed movement, and the stored originating subscriber number when the system selection mode is switched from the first communication mode to the second communication mode, and the moving speed of said mobile terminal falls in a range allowing low-speed mobile communication, and said mobile subscriber connecting apparatus adds the originating subscriber number to the call signal addressed to said mobile terminal.

9. A system according to claim 8, wherein said mobile terminal comprises fourth mode selecting means for selecting an ON/OFF state of an automatic calling mode of automatically generating an originating call for a stored originating subscriber number when the system selection mode is switched from the first communication mode to the second communication mode, and it is detected that the moving speed of said mobile terminal falls in a range allowing low-speed mobile communication, and when the automatic calling mode is set in the ON state by said fourth selecting means, an originating call is automatically generated for a stored originating subscriber number.

10. A system according to claim 8, wherein said mobile terminal comprises decrypting means for decrypting an original originating subscriber number when the originating subscriber number added to a received call signal is encrypted according to a predetermined rule, and said mobile subscriber connecting apparatus encrypts the originating subscriber number according to a predetermined rule and adding the encrypted number to a call signal addressed to said mobile terminal.

* * * * *